US011832172B2

(12) United States Patent
Rajput et al.

(10) Patent No.: US 11,832,172 B2
(45) Date of Patent: Nov. 28, 2023

(54) METHODS, SYSTEMS, AND COMPUTER READABLE MEDIA FOR MITIGATING SPOOFING ATTACKS ON SECURITY EDGE PROTECTION PROXY (SEPP) INTER-PUBLIC LAND MOBILE NETWORK (INTER-PLMN) FORWARDING INTERFACE

(71) Applicant: Oracle International Corporation, Redwood Shores, CA (US)

(72) Inventors: Jay Rajput, Bangalore (IN); Shashikiran Bhalachandra Mahalank, Bangalore (IN); Iyappan Chellasamy, Bangalore (IN)

(73) Assignee: ORACLE INTERNATIONAL CORPORATION, Redwood Shores (CA)

( * ) Notice: Subject to any disclaimer, the term of this patent is extended or adjusted under 35 U.S.C. 154(b) by 202 days.

(21) Appl. No.: 17/129,441

(22) Filed: Dec. 21, 2020

(65) Prior Publication Data
US 2022/0104112 A1    Mar. 31, 2022

Related U.S. Application Data

(63) Continuation-in-part of application No. 17/095,420, filed on Nov. 11, 2020.

(30) Foreign Application Priority Data

Sep. 25, 2020  (IN) .............................. 202041041754
Nov. 2, 2020   (IN) .............................. 202041047779

(51) Int. Cl.
*H04W 48/18*    (2009.01)
*H04W 48/16*    (2009.01)
(Continued)

(52) U.S. Cl.
CPC ......... *H04W 48/18* (2013.01); *H04L 63/0823* (2013.01); *H04L 67/56* (2022.05); *H04W 48/16* (2013.01); *H04W 84/042* (2013.01)

(58) Field of Classification Search
None
See application file for complete search history.

(56) References Cited

U.S. PATENT DOCUMENTS 6,091,958 A   7/2000  Bergkvist et al.
6,151,503 A   11/2000 Chavez
(Continued)

FOREIGN PATENT DOCUMENTS

CN    101277541 A    10/2008
CN    10135561 A     1/2009
(Continued)

OTHER PUBLICATIONS

S3-181480_pub.date_Apr. 16, 2018.pdf (Year: 2018).*
(Continued)

*Primary Examiner* — Jinsong Hu
*Assistant Examiner* — Alexander J Yi
(74) *Attorney, Agent, or Firm* — Jenkins, Taylor & Hunt, P.A.

(57) ABSTRACT

A method for mitigating spoofing attacks on an SEPP inter-PLMN forwarding interface includes obtaining, by a responding SEPP, a first SEPP identifier and/or a first PLMN identifier from at least one message received over an inter-PLMN control interface. The method further includes storing the first SEPP identifier and/or the first PLMN identifier in an identity cross-validation database. The method further includes obtaining, from at least one message received over an inter-PLMN forwarding interface a second SEPP identifier and/or a second PLMN identifier and performing a lookup in the identity cross-validation database using a (Continued)

lookup key comprising at least one of the second SEPP identifier and the second PLMN identifier, determining that a record corresponding to the lookup key is not present in the identity cross-validation database, and, in response, preventing the at least one message received over the inter-PLMN forwarding interface from entering a PLMN protected by the responding SEPP.

16 Claims, 8 Drawing Sheets

(51) Int. Cl.
　　　H04W 84/04　　　(2009.01)
　　　H04L 9/40　　　　(2022.01)
　　　H04L 67/56　　　(2022.01)

(56)　　　　　　　References Cited

U.S. PATENT DOCUMENTS

| | | |
|---|---|---|
| 6,292,666 B1 | 9/2001 | Siddiqui et al. |
| 6,308,075 B1 | 10/2001 | Irten et al. |
| 6,343,215 B1 | 1/2002 | Calabrese et al. |
| 6,591,101 B1 | 7/2003 | Shimbori |
| 7,043,754 B2 | 5/2006 | Arnouse |
| 7,567,661 B1 | 7/2009 | Wood et al. |
| 8,045,956 B2 | 10/2011 | Sun et al. |
| 8,145,234 B1 | 3/2012 | Leonard et al. |
| 8,509,074 B1 | 8/2013 | Roberts et al. |
| 8,615,217 B2 | 12/2013 | Ravishankar et al. |
| 8,879,431 B2 | 11/2014 | Ridel et al. |
| 9,015,808 B1 | 4/2015 | Koller et al. |
| 9,060,263 B1 | 6/2015 | Carames et al. |
| 9,106,428 B2 | 8/2015 | Matthews et al. |
| 9,106,769 B2 | 8/2015 | Kanode et al. |
| 9,191,803 B2 | 11/2015 | Patel et al. |
| 9,240,946 B2 | 1/2016 | Cai et al. |
| 9,374,840 B2 | 6/2016 | Monedero Recuero |
| 9,538,335 B1 | 1/2017 | Bank et al. |
| 9,628,994 B1 | 4/2017 | Gunyel et al. |
| 9,681,360 B1 | 6/2017 | Salyers et al. |
| 9,912,486 B1 | 3/2018 | Sharifi Mehr |
| 10,009,751 B2 | 6/2018 | Gundavelli et al. |
| 10,021,738 B1 | 7/2018 | Mehta et al. |
| 10,045,326 B2 | 8/2018 | Blanchard et al. |
| 10,168,413 B2 | 1/2019 | Annamalai et al. |
| 10,212,538 B2 | 2/2019 | Russell |
| 10,230,726 B2 | 3/2019 | Barkan |
| 10,237,721 B2 | 3/2019 | Gupta et al. |
| 10,306,459 B1 | 5/2019 | Patil et al. |
| 10,470,154 B2 | 11/2019 | Chellamani et al. |
| 10,511,998 B1 | 12/2019 | Vallur |
| 10,616,200 B2 | 4/2020 | Kumar et al. |
| 10,637,838 B1 | 4/2020 | Larios et al. |
| 10,652,850 B2 | 5/2020 | Landais et al. |
| 10,776,791 B2 | 9/2020 | Ferguson et al. |
| 10,834,045 B2 | 11/2020 | Mahalank et al. |
| 10,834,571 B1 | 11/2020 | Yau et al. |
| 10,931,668 B2 | 2/2021 | Mehta |
| 10,952,063 B2 | 3/2021 | Mehta |
| 10,984,128 B1 | 4/2021 | Hoffer |
| 11,050,788 B2 | 6/2021 | Livanos |
| 11,068,534 B1 | 7/2021 | Svendsen |
| 11,140,555 B2 | 10/2021 | Thai et al. |
| 11,265,695 B2 | 3/2022 | Shah et al. |
| 11,272,560 B1 | 3/2022 | Vivanco et al. |
| 11,368,839 B2 | 6/2022 | Targali |
| 11,411,925 B2 | 8/2022 | Kumar et al. |
| 11,516,671 B2 | 11/2022 | Rajput et al. |
| 11,528,251 B2 | 12/2022 | Rajput et al. |
| 11,553,342 B2 | 1/2023 | Mahalank et al. |
| 11,622,255 B2 | 4/2023 | Iddya et al. |
| 2001/0046856 A1 | 11/2001 | McCann |
| 2002/0080752 A1 | 6/2002 | Johansson et al. |
| 2002/0098856 A1 | 7/2002 | Berg et al. |
| 2002/0181448 A1 | 12/2002 | Uskela et al. |
| 2002/0193127 A1 | 12/2002 | Martschitsch |
| 2003/0087647 A1 | 5/2003 | Hurst |
| 2004/0140908 A1 | 7/2004 | Gladwin et al. |
| 2005/0182968 A1 | 8/2005 | Izatt et al. |
| 2005/0232236 A1 | 10/2005 | Allison et al. |
| 2006/0068762 A1 | 3/2006 | Baldwin et al. |
| 2006/0193258 A1 | 8/2006 | Ballai |
| 2006/0211406 A1 | 9/2006 | Szucs et al. |
| 2006/0242414 A1 | 10/2006 | Corson et al. |
| 2007/0011261 A1 | 1/2007 | Madams et al. |
| 2007/0165527 A1 | 7/2007 | Sultan et al. |
| 2007/0165626 A1 | 7/2007 | Sultan et al. |
| 2007/0174082 A1 | 7/2007 | Singh |
| 2007/0223372 A1 | 9/2007 | Haalen et al. |
| 2007/0248032 A1 | 10/2007 | Vasudevan et al. |
| 2007/0281718 A1 | 12/2007 | Nooren |
| 2008/0004047 A1 | 1/2008 | Hill et al. |
| 2008/0020704 A1 | 1/2008 | Costa |
| 2008/0026778 A1 | 1/2008 | Cai et al. |
| 2008/0045246 A1 | 2/2008 | Murtagh et al. |
| 2008/0051061 A1 | 2/2008 | Takahashi |
| 2008/0076430 A1 | 3/2008 | Olson |
| 2008/0125116 A1 | 5/2008 | Jiang |
| 2008/0168540 A1 | 7/2008 | Agarwal et al. |
| 2008/0207181 A1 | 8/2008 | Jiang |
| 2008/0222038 A1 | 9/2008 | Eden |
| 2008/0259798 A1 | 10/2008 | Loh et al. |
| 2009/0045251 A1 | 2/2009 | Jaiswal et al. |
| 2009/0168719 A1 | 7/2009 | Mercurio |
| 2009/0191915 A1 | 7/2009 | Abramson et al. |
| 2009/0195349 A1 | 8/2009 | Frader-Thompson et al. |
| 2010/0062789 A1 | 3/2010 | Agarwal et al. |
| 2010/0098414 A1 | 4/2010 | Kramer et al. |
| 2010/0100958 A1 | 4/2010 | Jeremiah |
| 2010/0105355 A1 | 4/2010 | Nooren |
| 2010/0130227 A1 | 5/2010 | Farthofer et al. |
| 2010/0161817 A1 | 6/2010 | Xiao et al. |
| 2010/0223222 A1 | 9/2010 | Zhou et al. |
| 2010/0235911 A1 | 9/2010 | Nooren |
| 2010/0240361 A1 | 9/2010 | Jiang |
| 2010/0313024 A1 | 12/2010 | Weniger et al. |
| 2011/0009085 A1 | 1/2011 | Albanes et al. |
| 2011/0014939 A1 | 1/2011 | Ravishankar et al. |
| 2011/0029655 A1 | 2/2011 | Forbes, Jr. et al. |
| 2011/0063126 A1 | 3/2011 | Kennedy et al. |
| 2011/0124317 A1 | 5/2011 | Joo |
| 2011/0124334 A1 | 5/2011 | Brisebois et al. |
| 2011/0158090 A1 | 6/2011 | Riley et al. |
| 2011/0173122 A1 | 7/2011 | Singhal |
| 2011/0191835 A1 | 8/2011 | Hawkes et al. |
| 2011/0217979 A1 | 9/2011 | Nas |
| 2011/0225091 A1 | 9/2011 | Plastina et al. |
| 2011/0246178 A1 | 10/2011 | Arzelier |
| 2011/0307381 A1 | 12/2011 | Kim et al. |
| 2012/0099715 A1 | 4/2012 | Ravishankar et al. |
| 2012/0110637 A1 | 5/2012 | Holtmanns et al. |
| 2012/0115512 A1 | 5/2012 | Grainger et al. |
| 2012/0131121 A1 | 5/2012 | Snyder et al. |
| 2012/0202481 A1 | 8/2012 | Martin |
| 2012/0203663 A1 | 8/2012 | Sinclair et al. |
| 2012/0207015 A1 | 8/2012 | Marsico |
| 2013/0035118 A1 | 2/2013 | Hamano et al. |
| 2013/0102231 A1 | 4/2013 | Joseph et al. |
| 2013/0102310 A1 | 4/2013 | Malonda |
| 2013/0171988 A1 | 7/2013 | Yeung et al. |
| 2013/0276035 A1 | 10/2013 | Walker et al. |
| 2013/0331063 A1 | 12/2013 | Cormier et al. |
| 2014/0195630 A1 | 7/2014 | Malik et al. |
| 2014/0199961 A1 | 7/2014 | Mohammed et al. |
| 2014/0199996 A1 | 7/2014 | Wang et al. |
| 2014/0259012 A1 | 9/2014 | Nandlall et al. |
| 2014/0280645 A1 | 9/2014 | Shuman et al. |
| 2014/0370922 A1 | 12/2014 | Richards |
| 2014/0378129 A1 | 12/2014 | Jiang et al. |
| 2015/0012415 A1 | 1/2015 | Livne et al. |
| 2015/0038156 A1 | 2/2015 | Kilpatrick, II et al. |
| 2015/0081579 A1 | 3/2015 | Brown et al. |

(56) References Cited

U.S. PATENT DOCUMENTS

| | | |
|---|---|---|
| 2015/0094060 A1 | 4/2015 | Kouridakis et al. |
| 2015/0119092 A1 | 4/2015 | Yi et al. |
| 2015/0121078 A1 | 4/2015 | Fu et al. |
| 2015/0188979 A1 | 7/2015 | Almeras et al. |
| 2015/0244486 A1 | 8/2015 | Liang et al. |
| 2015/0304220 A1 | 10/2015 | Miyao |
| 2015/0304803 A1 | 10/2015 | Chen et al. |
| 2015/0341341 A1 | 11/2015 | Messerges |
| 2015/0350196 A1 | 12/2015 | Toyonaga et al. |
| 2016/0088461 A1 | 3/2016 | Jiang |
| 2016/0119773 A1 | 4/2016 | Xu et al. |
| 2016/0156647 A1 | 6/2016 | Engel et al. |
| 2016/0165432 A1 | 6/2016 | Dubesset et al. |
| 2016/0183117 A1 | 6/2016 | Hsu et al. |
| 2016/0183178 A1 | 6/2016 | Marimuthu |
| 2016/0219043 A1 | 7/2016 | Blanke |
| 2016/0234119 A1 | 8/2016 | Zaidi et al. |
| 2016/0269566 A1 | 9/2016 | Gundamaraju et al. |
| 2016/0292687 A1 | 10/2016 | Kruglick |
| 2016/0337976 A1 | 11/2016 | Wang et al. |
| 2016/0365983 A1 | 12/2016 | Shahabuddin et al. |
| 2016/0381699 A1 | 12/2016 | Rubin et al. |
| 2017/0006431 A1 | 1/2017 | Donovan et al. |
| 2017/0142547 A1 | 5/2017 | Hou et al. |
| 2017/0201778 A1 | 7/2017 | Bailey et al. |
| 2017/0244676 A1 | 8/2017 | Edwards |
| 2017/0245207 A1 | 8/2017 | Stammers et al. |
| 2017/0245280 A1 | 8/2017 | Yi et al. |
| 2017/0257866 A1 | 9/2017 | Chaudhuri et al. |
| 2017/0272921 A1 | 9/2017 | Kim et al. |
| 2017/0289048 A1 | 10/2017 | Chao et al. |
| 2017/0295201 A1 | 10/2017 | Peylo et al. |
| 2017/0345006 A1 | 11/2017 | Kohli |
| 2017/0366499 A1 | 12/2017 | De Boer et al. |
| 2018/0020324 A1 | 1/2018 | Beauford |
| 2018/0109632 A1 | 4/2018 | Stammers et al. |
| 2018/0109953 A1 | 4/2018 | He |
| 2018/0115970 A1 | 4/2018 | Chae et al. |
| 2018/0167906 A1 | 6/2018 | Chellamani et al. |
| 2018/0205698 A1 | 7/2018 | Gupta et al. |
| 2018/0220301 A1 | 8/2018 | Gallagher et al. |
| 2018/0270765 A1 | 9/2018 | Wang |
| 2018/0288127 A1 | 10/2018 | Zaidi et al. |
| 2018/0288198 A1 | 10/2018 | Pope et al. |
| 2018/0310162 A1 | 10/2018 | Kim et al. |
| 2019/0007788 A1 | 1/2019 | Russell |
| 2019/0037484 A1 | 1/2019 | Davies et al. |
| 2019/0044932 A1 | 2/2019 | Kumar et al. |
| 2019/0074982 A1 | 3/2019 | Hughes |
| 2019/0090086 A1 | 3/2019 | Graham et al. |
| 2019/0116624 A1 | 4/2019 | Tandon et al. |
| 2019/0182875 A1 | 6/2019 | Talebi Fard et al. |
| 2019/0253885 A1 | 8/2019 | Bykampadi et al. |
| 2019/0306166 A1 | 10/2019 | Konda et al. |
| 2019/0342217 A1 | 11/2019 | Mazurek |
| 2019/0354709 A1 | 11/2019 | Brinskelle |
| 2019/0364064 A1 | 11/2019 | Gupta et al. |
| 2019/0364460 A1 | 11/2019 | Bogineni et al. |
| 2020/0007538 A1 | 1/2020 | Mehta |
| 2020/0036754 A1 | 1/2020 | Livanos |
| 2020/0042799 A1 | 2/2020 | Huang et al. |
| 2020/0053044 A1 | 2/2020 | Mahalank et al. |
| 2020/0077260 A1 | 3/2020 | Hancock et al. |
| 2020/0107291 A1 | 4/2020 | Nayak et al. |
| 2020/0145432 A1 | 5/2020 | Verma et al. |
| 2020/0169510 A1 | 5/2020 | Kadosh et al. |
| 2020/0187089 A1 | 6/2020 | Meredith et al. |
| 2020/0221541 A1 | 7/2020 | Yan |
| 2020/0259896 A1 | 8/2020 | Sachs et al. |
| 2020/0329363 A1 | 10/2020 | Mehta |
| 2020/0344604 A1 | 10/2020 | He et al. |
| 2020/0359218 A1 | 11/2020 | Lee et al. |
| 2020/0404490 A1 | 12/2020 | Thai et al. |
| 2021/0022070 A1 | 1/2021 | Letor et al. |
| 2021/0111985 A1 | 4/2021 | Mahalank et al. |
| 2021/0112012 A1 | 4/2021 | Krishan et al. |
| 2021/0142143 A1 | 5/2021 | Howard |
| 2021/0152494 A1 | 5/2021 | Johnsen et al. |
| 2021/0168751 A1 | 6/2021 | Stojanovski et al. |
| 2021/0176177 A1 | 6/2021 | Kubo et al. |
| 2021/0194903 A1 | 6/2021 | Medvedovsky et al. |
| 2021/0203636 A1 | 7/2021 | Kumar et al. |
| 2021/0203643 A1 | 7/2021 | Jost et al. |
| 2021/0211946 A1 | 7/2021 | Li |
| 2021/0234706 A1 | 7/2021 | Nair et al. |
| 2021/0243165 A1 | 8/2021 | Bykampadi et al. |
| 2021/0250186 A1 | 8/2021 | Bykampadi et al. |
| 2021/0258824 A1 | 8/2021 | John et al. |
| 2021/0274436 A1 | 9/2021 | Sun et al. |
| 2021/0297942 A1 | 9/2021 | Bykampadi et al. |
| 2021/0321303 A1 | 10/2021 | Nair et al. |
| 2021/0377138 A1 | 12/2021 | Sun et al. |
| 2021/0377212 A1 | 12/2021 | Holtmanns et al. |
| 2021/0399988 A1 | 12/2021 | Labonte |
| 2021/0400538 A1 | 12/2021 | Ke |
| 2021/0406038 A1 | 12/2021 | Fetzer et al. |
| 2022/0021586 A1 | 1/2022 | Kazmierski |
| 2022/0022027 A1 | 1/2022 | Xin et al. |
| 2022/0022040 A1 | 1/2022 | Mahalank et al. |
| 2022/0030413 A1 | 1/2022 | Ben Henda et al. |
| 2022/0038394 A1 | 2/2022 | Anubolu et al. |
| 2022/0052847 A1 | 2/2022 | Gonzalez Cervantes et al. |
| 2022/0070674 A1 | 3/2022 | Russell |
| 2022/0104020 A1 | 3/2022 | Rajput |
| 2022/0124079 A1 | 4/2022 | Patil et al. |
| 2022/0124479 A1 | 4/2022 | Iddya |
| 2022/0124501 A1 | 4/2022 | Bykampadi et al. |
| 2022/0150212 A1 | 5/2022 | Rajput |
| 2022/0158847 A1 | 5/2022 | Aggarwal et al. |
| 2022/0159445 A1 | 5/2022 | Rajavelu |
| 2022/0174544 A1 | 6/2022 | Taft et al. |
| 2022/0182923 A1 | 6/2022 | Yao et al. |
| 2022/0191694 A1 | 6/2022 | Rajput |
| 2022/0191763 A1 | 6/2022 | Roeland et al. |
| 2022/0200951 A1 | 6/2022 | Goel |
| 2022/0200966 A1 | 6/2022 | De-Gregorio-Rodriguez et al. |
| 2022/0201489 A1 | 6/2022 | Mahalank |
| 2022/0240084 A1 | 7/2022 | Speidel et al. |
| 2022/0256312 A1 | 8/2022 | Kim et al. |
| 2022/0264260 A1 | 8/2022 | Chaurasia et al. |
| 2022/0272069 A1 | 8/2022 | Verma et al. |
| 2022/0272541 A1 | 8/2022 | Rajput et al. |
| 2022/0369091 A1 | 11/2022 | Nair |

FOREIGN PATENT DOCUMENTS

| | | | |
|---|---|---|---|
| CN | 101742445 A | 6/2010 | |
| CN | 101917698 A | 12/2010 | |
| CN | 102656845 A | 9/2012 | |
| CN | 103179504 A | 6/2013 | |
| CN | 103444212 A | 12/2013 | |
| CN | 107800664 A | 3/2018 | |
| CN | 108307385 A | 7/2018 | |
| CN | 110035433 A | 7/2019 | |
| CN | 110800322 B | 5/2021 | |
| CN | ZL202080007649.X | 9/2022 | |
| EP | 1 067 492 A2 | 1/2001 | |
| EP | 1 906 682 A1 | 4/2008 | |
| EP | 2 204 955 A1 | 7/2010 | |
| EP | 2 785 125 B1 | 8/2018 | |
| EP | 3 493 569 A1 | 6/2019 | |
| EP | 3 646 630 B1 | 8/2021 | |
| EP | 3 662 630 | 8/2021 | |
| EP | 3954146 A1 | 2/2022 | |
| EP | 3 821 630 B1 | 7/2022 | |
| EP | 3954146 B1 | 6/2023 | |
| ES | 2 548 005 T3 | 10/2015 | |
| GB | 2503973 A | * 1/2014 | ............ G06F 21/44 |
| IN | 401247 | 7/2018 | |
| JP | 2008-053808 A | 3/2008 | |
| JP | 7038148 B2 | 3/2022 | |
| JP | 7113147 B | 8/2022 | |
| JP | 7133010 | 8/2022 | |
| JP | 7133010 B2 | 9/2022 | |

(56) References Cited

FOREIGN PATENT DOCUMENTS

| | | | |
|---|---|---|---|
| JP | 7198339 B | 12/2022 | |
| JP | 7246418 B2 | 3/2023 | |
| KR | 20180069737 A | * 6/2018 | ............ H04L 12/12 |
| WO | WO 01/88790 A1 | 11/2001 | |
| WO | WO 2005/091656 A1 | 9/2005 | |
| WO | WO 2005/101872 A1 | 10/2005 | |
| WO | WO 2007/084503 A2 | 7/2007 | |
| WO | WO 2008/053808 A1 | 5/2008 | |
| WO | WO-2010/021886 A1 | 2/2010 | |
| WO | WO 2010/045646 A2 | 4/2010 | |
| WO | WO 2010/105099 A2 | 9/2010 | |
| WO | WO 2011/010640 A1 | 1/2011 | |
| WO | WO 2011/047382 A2 | 4/2011 | |
| WO | WO 2016/201990 A1 | 12/2016 | |
| WO | WO 2017/082532 A1 | 5/2017 | |
| WO | WO 2019/158028 A1 | 8/2018 | |
| WO | WO 2018/202284 A1 | 11/2018 | |
| WO | WO 2019/005287 A1 | 1/2019 | |
| WO | WO 2019/027813 A1 | 2/2019 | |
| WO | WO 2019/224157 A1 | 11/2019 | |
| WO | WO 2020/013889 A1 | 1/2020 | |
| WO | WO 2020/033113 A1 | 2/2020 | |
| WO | WO 2020/036883 A1 | 2/2020 | |
| WO | WO 2020/164763 A1 | 8/2020 | |
| WO | WO 2020/174121 A1 | 9/2020 | |
| WO | WO 2020/179665 A1 | 9/2020 | |
| WO | WO 2020/210015 A1 | 10/2020 | |
| WO | WO 2020/257018 A1 | 12/2020 | |
| WO | WO 2021/138072 A1 | 7/2021 | |
| WO | WO 2022/015378 A1 | 1/2022 | |
| WO | WO 2022/046176 A1 | 3/2022 | |
| WO | WO 2022/066227 | 3/2022 | |
| WO | WO 2022/086596 A1 | 4/2022 | |
| WO | WO 2022/098404 A1 | 5/2022 | |
| WO | WO 2022/103454 A1 | 5/2022 | |
| WO | WO 2022/132315 A1 | 6/2022 | |
| WO | WO 2022/132316 A1 | 6/2022 | |
| WO | WO 2022/182448 A1 | 9/2022 | |
| WO | WO 2022/240582 A1 | 11/2022 | |
| ZM | 201880040478.3 | 4/2022 | |

OTHER PUBLICATIONS

S3-192180_pub.date_Jun. 24, 2019.pdf (Year: 2019).*

"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).

"3rd Generation Partnership Project; Technical Specification Group Services and System Aspects; Security architecture and procedures for 5G system (Release 16)," 3GPP TS 33.501, V16.4.0, pp. 1-249 (Sep. 2020).

"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).

Dierks et al., "The Transport Layer Security (TLS) Protocol Version 1.2,"RFC 5246, pp. 1-208 (Aug. 2008).

Housley et al., "Internet X.509 Public Key Infrastructure Certificate and Certificate Revocation List (CRL) Profile,"RFC 3280, pp. 1-258 (Apr. 2002).

Notification of Transmittal of the International Search Report and the Written Opinion of the International Searching Authority, or the Declaration for International Application No. PCT/US2022/013373 (dated Apr. 11, 2022).

Non-Final Office Action and Examiner Interview Summary for U.S. Appl. No 16/929,048 (dated Apr. 14, 2022).

Notice of Allowance for U.S. Appl. No. 16/732,098 (dated Apr. 6, 2022).

Examination Report for Indian Application Serial No. 202147030053 (dated Mar. 22, 2022).

Notification of Transmittal of the International Search Report and the Written Opinion of the International Searching Authority or the Declaration for International Application No. PCT/US2021/057156 (dated Mar. 3, 2022).

Non-Final Office Action for Chinese Application Serial No. 202080007649.X (dated Mar. 2, 2022).

Non-Final Office Action for U.S. Appl. No. 17/076,482 (dated Apr. 12, 2022).

Nokia et al., "Support of the mapping from IP addressing information provided to an AF to the user identity," 3GPP SA WG2 Meeting #142e pp. 1-3 (Nov. 16-20, 2020).

China Telecom, "KI #13, New Sol: Trigger Procedures for Requesting Analytics," 3GPP SA WG2 Meeting #S2-139E pp. 1-4 (Aug. 19-Sep. 2, 2020).

First Office Action for Japanese Application Serial No. 2021545918 (dated Mar. 8, 2022).

Non-Final Office Action for U.S. Appl. No. 17/129,487 (dated Mar. 21, 2022).

Decision to grant a European patent pursuant to Article 97(1) EPC for European Patent Application Serial No. 197108426 (dated Feb. 24, 2022).

Notice of Allowance for Chinese Application Serial No. 201880040478.3 (dated Feb. 28, 2022).

Notice of Allowance for Japanese Application Serial No. 2019572174 (dated Feb. 6, 2022).

Final Office Action for U.S. Appl. No. 17/099,683 (dated Feb. 15, 2022).

Notification of Transmittal of the International Search Report and the Written Opinion of the International Searching Authority, or the Declaration for International Application No. PCT/US2021/057157 (dated Jan. 27, 2022).

Notification Concerning Availability ofthe Publication of the International Application for International Application No. PCT/US2021/024002 (dated Jan. 20, 2022).

Examination Report for Indian Application Serial No. 202147005810 (dated Jan. 24, 2022).

Examination Report for Indian Application Serial No. 202147001641 (dated Jan. 13, 2022).

Examination Report for Indian Application Serial No. 202047056970 (dated Jan. 13, 2022)

Commonly-assigned, co-pending U.S. Appl. No. 17/319,023 for "Methods, Systems, and Computer Readable Media for Conducting a Velocity Check for Outbound Subscribers Roaming to Neighboring Countries," (Unpublished May 12, 2021).

Nokia et al., "3gpp-Sbi-Consumer-Id," 3GPP TSG-CT WG4 Meeting #101e pp. 1-4 (Nov. 3-13, 2020).

Nokia et al., "SBA Network Function certificate profile," 3GPTT TSG-SA WG3 Meeting #98e pp. 1-5 (Mar. 2-6, 2020).

"3rd Generation Partnership Project; Technical Specification Group Services and System Aspects; Security Aspects; Study on security aspects of the 5G Service Based Architecture (SBA) (Release 16)," 3GPP TR 33.855, V1.3.0 pp. 1-52. (Nov. 2018).

Notification of Transmittal of the International Search Report and the Written Opinion of the International Searching Authority, or the Declaration for International Application No. PCT/US2021/042660 (dated Oct. 26, 2021).

Hearing Notice of Indian Application Serial No. 201947047367 (dated Oct. 11, 2021).

First Office Action for Japanese Application Serial No. 2019572174 (dated Sep. 14, 2021).

Notification of Transmittal of the International Search Report and the Written Opinion of the International Searching Authority, or the Declaration for International Application No. PCT/US2021/033030 (dated Aug. 20, 2021).

First Office Action for Chinese Application Serial No. 201880040478.3 (dated Aug. 26, 2021).

Notification Concerning Availability ofthe Publication of the International Application for International Application No. PCT/US2020/065763 (Jul. 8, 2021).

Non-Final Office Action for U.S. Appl. No. 17/099,683 (dated Sep. 20, 2021).

"5G; Procedures for the 5G System (3GPP TS 23.502 version 15.3.0 Release 15)," ETSI TS 123 502, V15.3.0. pp. 1-330 (Sep. 2018).

(56) References Cited

OTHER PUBLICATIONS

Communication of European publication number and information on the application of Article 67(3) EPC for European Patent Application Serial No. 19730571.7 (dated Apr. 8, 2021).
International Search Report for International Patent Application Serial No. PCT/US2020/065763 (dated Apr. 6, 2021).
First Examination Report for Indian Patent Application Serial No. 201947047367(dated Mar. 31, 2021).
Notice of Allowance for Chinese Patent Application Serial No. 201880040477.9 (dated Mar. 29, 2021).
Communication under Rule 71 (3) EPC Intention to Grant for European Patent Application Serial No. 18 731 923.1 (dated Mar. 22, 2021).
First Examination Report for Indian Patent Application Serial No. 201947047012 (dated Mar. 18, 2021).
Decision to grant a European patent pursuant to Article 97(1) EPC for European Patent Application Serial No. 187560180 (dated Jul. 29, 2021).
Decision to grant a European patent pursuant to Article 97(1) EPC for European Patent Application Serial No. 18731923.1 (dated Jul. 15, 2021).
Notification of Transmittal of the International Search Report and the Written Opinion of the International Searching Authority, or the Declaration for International Application No. PCT/US2021/029977 (dated Jul. 9, 2021).
Notification of Transmittal of the International Search Report and the Written Opinion of the International Searching Authority, or the Declaration for International Application No. PCT/US2021/029973 (dated Jul. 7, 2021).
Notification of Transmittal of the International Search Report and the Written Opinion of the International Searching Authority, or the Declaration for International Application No. PCT/US2021/024002 (dated Jun. 29, 2021).
Notification of Transmittal of the International Search Report and the Written Opinion of the International Searching Authority, or the Declaration for International Application No. PCT/US2021/024980 (dated Jun. 23, 2021).
Communication of European publication number and information on the application of Article 67(3) EPC for European Patent Application Serial No. 19710842.6 (Apr. 21, 2021).
"3rd Generation Partnership Project; Technical Specification Group Services and System Aspects; Security Aspects; Study on security aspects of the 5G Service based Architecture (SBA) (Release 16)," 3GPP TR 33.855, V16.0.0, pp. 1-104 (Jul. 2020).
"3rd Generation Partnership Project; Technical Specification Group Services and System Aspects; Security Assurance Specification (SCAS) threats and critical assets in 3GPP network product classes (Release 16)," 3GPP TR 33.926 V16.3.0, pp. 1-60(Mar. 2020).
"New Annex for the SEPP in TR 33.926," 3GPP TSG-SA WG3 Meeting #95-BIS, pp. 1-6 (Jun. 24-28, 2019).
"N32 message anti-spoofing within the SEPP,"3GPP TSG SA WG3 (Security), Meeting #91, pp. 1-2 (Apr. 16-20, 2018).
Commonly-assigned, co-pending U.S. Appl. No. 17/129,487 for "Methods, Systems, and Computer Readable Media for Ingress Message Rate Limiting," (Unpublished, filed Dec. 21, 2020).
Commonly-assigned, co-pending U.S. Appl. No. 17/125,943 for "Methods, Systems, and Computer Readable Media for Mitigating 5G Roaming Attacks for Internet of Things (IoT) Devices Based on Expected User Equipment (UE) Behavior Patterns," (Unpublished, filed Dec. 17, 2020).
Commonly-assigned, co-pending U.S. Appl. No. 17/123,038 for "Methods, Systems, and Computer Readable Media for Message Validation in Fifth Generation (5G) Communications Networks," (Unpublished, filed Dec. 15, 2020).
Commonly-assigned, co-pending U.S. Appl. No. 17/099,683 for "Methods, Systems, and Computer Readable Media for Validating Location Update Messages," (Unpublished, filed Nov. 16, 2020).
Commonly-assigned, co-pending U.S. Appl. No. 17/095,420 for "Methods, Systems, and Computer Readable Media for Mitigating 5G Roaming Spoofing Attacks," (Unpublished, filed Nov. 11, 2020).

Notice of Allowance and Fee(s) Due and Examiner-Initiated Interview Summary for U.S. Appl. No. 16/379,488 (dated Oct. 23, 2020).
Commonly-assigned, co-pending U.S. Appl. No. 17/076,482 for "Methods, Systems, and Computer Readable Media for Validating a Session Management Function (SMF) Registration Request," (Unpublished, filed Oct. 21, 2020).
Notice of Allowance and Fee(s) Due and Examiner-Initiated Interview Summary for U.S. Appl. No. 16/024,422 (dated Oct. 21, 2020).
"3rd Generation Partnership Project; Technical Specification Group Core Network and Terminals; 5G System; Authentication Server Services; Stage 3 (Release 16)," 3GPP TS 29.509, V16.5.0 pp. 1-60 (Sep. 2020).
"3rd Generation Partnership Project; Technical Specification Group Core Network and Terminals; 5G System; Network Function Repository Services; Stage 3 (Release 16)," 3GPP TS 29.510, V16.5.0, pp. 1-208 (dated Sep. 2020).
"3rd Generation Partnership Project; Technical Specification Group Core Network and Terminals; Numbering, addressing and identification; (Release 16)," 3GPP TS 23.003, V16.4.0, pp. 1-141 (Sep. 2020).
"3rd Generation Partnership Project; Technical Specification Group Core Network and Terminals; 5G System; Session Management Services; Stage 3 (Release 16)," 3GPP TS 29.502, V16.5.0, pp. 1-260 (Sep. 2020).
"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).
3rd Generation Partnership Project; Technical Specification Group Services and System Aspects; Procedures for the 5G System (5GS); Stage 2 (Release 16), 3GPP TS 23.502, V16.6.0, pp. 1-597 (Sep. 2020).
Notice of Allowance and Fee(s) Due and Examiner-Initiated Interview Summary for U.S. Appl. No. 16/100,172 (dated Sep. 14, 2020).
Commonly-assigned, co-pending U.S. Appl. No. 17/008,528 for "Methods, Systems, and Computer Readable Media for 5G User Equipment (UE) Historical Mobility Tracking and Security Screening Using Mobility Patterns," (Unpublished, filed Aug. 31, 2020).
First Office Action for Chinese Application Serial No. 201880040477.9 (dated Aug. 5, 2020).
"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).
"3rd Generation Partnership Project; Technical Specification Group Core Network and Terminals; 5G System; Network Function Repository Services; Stage 3 (Release 16)," 3GPP TS 29.510, V16.4.0, pp. 1-206 (Jul. 2020).
Notification of Transmittal of the International Search Report and the Written Opinion of the International Searching Authority, or the Declaration for International Application No. PCT/US2020/024234 (dated Jul. 16, 2020).
Non-Final Office Action for U.S. Appl. No. 16/379,488 (dated Jul. 15, 2020).
Commonly-assigned, co-pending U.S. Appl. No. 16/929,048 for "Methods, Systems, and Computer Readable Media for Mitigating 5G Roaming Security Attacks Using Security Edge Protection Proxy (SEPP)," (Unpublished, filed Jul. 14, 2020).
"3rd Generation Partnership Project; Technical Specification Group Services and System Aspects; Architecture enhancements for 5G System (5GS) to support network data analytics services (Release 16)," 3GPP TS 23.288 V16.4.0, pp. 1-66 (Jul. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.3.0, pp. 1-86 (Jul. 2020).
"3rd Generation Partnership Project; Technical Specification Group Services and System Aspects; Security architecture and procedures for 5G system (Release 16)," 3GPP TS 33.501, V16.3.0, pp. 1-248 (Jul. 2020).
Non-Final Office Action for U.S. Appl.l No. 16/024,422 (dated Jul. 8, 2020).

(56) References Cited

OTHER PUBLICATIONS

"3rd Generation Partnership Project; Technical Specification Group Core Network and Terminals; 5G System; Network Function Repository Services; Stage 3 (Release 16)," 3GPP TS 29.510, V16.4.0, pp. 1-192 (Jul. 2020).

Applicant-Initiated Interview Summary for U.S. Appl. No. 16/100,172 (dated Jun. 9, 2020).

"3rd Generation Partnership Project; Technical Specification Group Core Network and Terminals; 5G System; Technical Realization of Service Based Architecture; Stage 3 (Release 16)," 3GPP TS 29.500 V16.4.0, pp. 1-79 (Jun. 2020).

"3rd Generation Partnership Project; Technical Specification Group Core Network and Terminals; 5G System; Network Data Analytics Services; Stage 3 (Release 16)," 3GPP TS 29.520 V16.4.0, pp. 1-91 (Jun. 2020).

Communication of European publication number and information on the application of Article 67(3) EPC for European Application Serial No. 187319231 (dated Apr. 8, 2020).

"3rd Generation Partnership Project; Technical Specification Group Services and System Aspects; Security architecture and procedures for 5G system (Release 16)," 3GPP TS 33.501, V16.2.0, pp. 1-227 (Mar. 2020).

"3rd Generation Partnership Project; Technical Specification Group Services and System Aspects; Procedures for the 5G System (5GS); Stage 2 (Release 16)," 3GPP TS 23.502, V16.4.0, pp. 1-582 (Mar. 2020).

Non-Final Office Action for U.S. Appl. No. 16/100,172 (dated Mar. 6, 2020).

Notice of Allowance and Fee(s) Due and Examiner-Initiated Interview Summary for U.S. Appl. No. 15/666,300 (dated Feb. 13, 2020).

Commonly-assigned, co-pending U.S. Appl. No. 16/732,098 for "Methods, Systems, and Computer Readable Media for Implementing Indirect General Packet Radio Service (GPRS) Tunneling Protocol (GTP) Firewall Filtering Using Diameter Agent and Signal Transfer Point (STP)," (Unpublished, filed Dec. 31, 2019).

Advisory Action and Applicant-Initiated Interview Summary for U.S. Appl. No. 16/100,172 (dated Dec. 20, 2019).

"3rd Generation Partnership Project; Technical Specification Group Services and System Aspects; 5G Security Assurance Specification (SCAS) for the Security Edge Protection Proxy (SEPP) network product class (Release 16)," 3GPP TS 33.517, V.16.1.0, pp. 1-17 (Dec. 2019).

"FS.19 Diameter Interconnect Security," GSMA, pp. 1-3 (Dec. 20, 2019).

Notification of Transmittal of the International Search Report and the Written Opinion of the International Searching Authority, or the Declaration for International Application Serial No. PCT/US2019/042203 (dated Nov. 11, 2019).

Applicant-Initiated Interview Summary for U.S. Appl. No. 15/666,300 (dated Oct. 29, 2019).

Final Office Action for U.S. Appl. No. 16/100,172 (dated Oct. 3, 2019).

"Technical Specification Group Core Network and Terminals; Evolved Packet System (EPS); Mobility Management Entity (MME) and Serving GPRS Support Node (SGSN) related interfaces based on Diameter protocol (Release 16)," 3GPP TS 29.272, V16.0.0, pp. 1-180 (Sep. 2019).

"Technical Specification Group Core Network and Terminals; Policy and Charging Control (PCC); Reference points (Release 16)," 3GPP TS 29.212, V16.1.0, pp. 1-285 (Sep. 2019).

Notification of Transmittal of the International Search Report and the Written Opinion of the International Searching Authority, or the Declaration for International Application Serial No. PCT/US2019/028814 (dated Aug. 20, 2019).

Applicant-Initiated Interview Summary for U.S. Appl. No. 16/100,172 (dated Jul. 18, 2019).

Notice of Allowance and Fee(s) Due and Examiner-Initiated Interview Summary for U.S. Appl. No. 15/376,631 (dated Jul. 2, 2019).

"Technical Specification Group Core Network and Terminals; Mobile Application Part (MAP) specification (Release 15)," 3GPP TS 29.002, V15.5.0, pp. 1-1024 (Jun. 2019).

Non Final Office Action for U.S. Appl. No. 15/666,300 (dated Jun. 27, 2019).

Decision on Appeal for U.S. Appl. No. 13/047,287 (dated Jun. 18, 2019).

Notification of Transmittal of the International Search Report and the Written Opinion of the International Searching Authority, or the Declaration for International Patent Application No. PCT/US2019/018990 (dated May 8, 2019).

Commonly-assigned, co-pending U.S. Appl. No. 16/379,488 for "Methods, Systems, and Computer Readable Media for Dynamically Learning and Using Foreign Telecommunications Network Mobility Management Node Information for Security Screening," (Unpublished, filed Apr. 9, 2019).

Non-Final Office Action for U.S. Appl. No. 16/100,172 (dated Apr. 11, 2019).

Notice of Allowance and Fee(s) Due for U.S. Appl. No. 16/035,008 (dated Jan. 18, 2019).

Advisory Action Before the Filing of an Appeal Brief and AFCP 2.0 Decision for U.S. Appl. No. 15/376,631 (dated Dec. 19, 2018).

Notice of Allowance and Fee(s) Due and Applicant-Initiated Interview Summary for U.S. Appl. No. 15/408,155 (dated Oct. 31, 2018).

Sahu et al., "How 5G Registration Works," http://5gblogs.com/5g-registration/, 10 pages (Oct. 12, 2018).

Notification of Transmittal of the International Search Report and the Written Opinion of the International Searching Authority, or the Declaration for International Patent Application No. PCT/US2018/043985 (dated Oct. 9, 2018).

Final Office Action for U.S. Appl. No. 15/376,631 (dated Oct. 5, 2018).

Notice of Allowance and Fee(s) Due for U.S. Appl. No. 15/636,118 (dated Oct. 3, 2018).

Notification of Transmittal of the International Search Report and the Written Opinion of the International Searching Authority, or the Declaration for International Application No. PCT/US2018/030319 (dated Aug. 20, 2018).

Final Office Action for U.S. Appl. No. 15/408,155 (dated Jul. 26, 2018).

Notice of Allowance and Fee(s) Due for U.S. Appl. No. 15/636,118 (dated Apr. 27, 2018).

Non-Final Office Action for U.S. Appl. No. 15/376,631 (dated Apr. 18, 2018).

"Signalling Security in Telecom SS7/Diameter/5G," Enisa, pp. 1-30 (Mar. 2018).

Examiner's Answer for U.S. Appl. No. 13/047,287 (dated Feb. 26, 2018).

Advisory Action Before the Filing of an Appeal Brief and AFCP 2.0 Decision for U.S. Appl. No. 15/376,631 (dated Feb. 2, 2018).

Non-Final Office Action for U.S. Appl. No. 15/408,155 (dated Jan. 9, 2018).

Final Office Action for U.S. Appl. No. 15/376,631 (dated Nov. 28, 2017).

"GSMA Guidelines for Diameter Firewall," NetNumber Inc., pp. 1-7 (Sep. 12, 2017).

"Oracle Communications Diameter Signaling Router Main Differentiators," Oracle White Paper, pp. 1-10 (Jul. 2017).

"LTE and EPC Roaming Guidelines," GSM Association, Official Document IR.88, V 16.0, pp. 1-90 (Jul. 5, 2017).

Non-Final Office Action for U.S. Appl. No. 15/376,631 (dated Jun. 16, 2017).

"LTE International Roaming Whitepaper," http://carrier.huawei.com/en/technical-topics/core-network/lteroaming-whitepaper, pp. 1-16 (Downloaded May 12, 2017).

"Digital cellular telecommunications system (Phase 2+) (GSM); Universal Mobile Telecommunications System (UMTS); Universal Geographical Area Description (GAD) (3GPP TS 23.032 V 14.0.0 Release 14)," ETSI TS 123 032 V14.0.0, pp. 1-30 (May 2017).

Final Office Action for U.S. Appl. No. 13/047,287 (dated Mar. 10, 2017).

(56) References Cited

OTHER PUBLICATIONS

"3rd Generation Partnership Project; Technical Specification Group Services and System Aspects; Functional stage 2 description of Location Services (LCS) (Release 14)," 3GPP TS 23.271 V14.1.0, pp. 1-181 (Mar. 2017).
"Digital cellular telecommunications system (Phase 2+) (GSM); Universal Mobile Telecommunications System (UMTS); LTE; Cx and Dx interfaces based on the Diameter protocol; Protocol details (3GPP TS 29.229 V 13.1.0 Release 13)," ETSI TS 129 229 V13.1.0, pp. 1-42 (Jan. 2017).
"Edge Router (DEA)," http://www.mavenir.com/our-products/mobile/edge-router-dea, pp. 1-7 (Copyright 2017).
Non-Final Office Action for U.S. Appl. No. 13/047,287 (dated Aug. 25, 2016).
"Digital cellular telecommunications system (Phase 2+); Universal Mobile Telecommunications System (UMTS); Numbering, addressing and identification (3GPP TS 23.003 V 12.9.0 Release 12)," ETSI TS 1 23 003 V12.9.0, pp. 1-93 (Mar. 2016).
"Syniverse Guide to LTE Roaming and Interoperability," https://www.syniverse.com/assets/files/custom_content/lte-roaming-interoperability-guide.pdf, pp. 1-11 (Jan. 8, 2016).
"Digital cellular telecommunications system (Phase 2+) (GSM); Universal Mobile Telecommunications System (UMTS); LTE; Location Services (LCS); LCS Application Protocol (LCS-AP) between the Mobile Management Entity (MME) and Evolved Serving Mobile Location Centre (E-SMLC); SLs interface (3GPP TS 29.171 V 11.4.0 Release 11)," ETSI TS 129 171 V11.4.0, pp. 1-52 (Jan. 2016).
"Diameter Signaling Control (DSC)," https://www.extent.com/diameter-signaling-control-dsc/, pp. 1-3 (Copyright 2016).
Kotte, "Analysis and Experimental Verification of Diameter Attacks in Long Term Evolution Networks, " http://www.diva-portal.org/smash/get/diva2:951619/FULLTEXT01.pdf, pp. 1-72(2016).
Advisory Action Before the Filing of an Appeal Brief for U.S. Appl. No. 13/047,287 (dated Oct. 16, 2015).
"The Dialogic® HelixTM Signaling Controller," https://www.dialogic.com/- /media/products/docs/brochures/14090-helix-br.pdf, pp. 1-5 (Aug. 2015).
Final Office Action for U.S. Appl. No. 13/047,287 (dated Jun. 4, 2015).
"Digitial cellular telecommunications system (Phase 2+); Universal Mobile Telecommunications System (UMTS); LTE; Location Services (LCS); Evolved Packet Core (EPC) LCS Protocol (ELP) between the Gateway Mobile Location Centre (GMLC) and the Mobile Management Entity (MME); SLg interface (3GPP TS 29.172 version 9.6.0 Release 9)," ETSI TS 129 172, V9.6.0, pp. 1-27 (Apr. 2015).
"Digital cellular telecommunications system (Phase 2+); Universal Mobile Telecommunications System (UMTS); LTE; Location Services (LCS); Diameter-based SLh interface for Control Plane LCS (3GPP TS 29.173 version 12.2.0 Release 12)," ETSI TS 129 173, V12.2.0., p. 1-20 (Oct. 2014).
Non-Final Office Action for U.S. Appl. No. 13/047,287 (dated Sep. 25, 2014).
Supplemental Notice of Allowance and Fee(s) Due for U.S. Appl. No. 12/823,559 (dated Aug. 23, 2013).
Notice of Allowance and Fee(s) Due for U.S. Appl. No. 12/823,559 (dated Aug. 1, 2013).
Email to U.S. Patent and Trademark Office dated Jun. 28, 2013.
Final Office Action for U.S. Appl. No. 12/823,559 (dated Apr. 11, 2013).
Final Office Action for U.S. Appl. No. 13/047,287 (dated Jan. 31, 2013).
Non-Final Office Action for U.S. Appl. No. 12/823,559 (dated Nov. 14, 2012).
"Digital cellular telecommunications system (Phase 2+); Universal Monile Telecommunications System (UMTS); LTE; Location Services (LCS); Service description; Stage1 (3GPP TS 22.071 V11.0.0 Release 11," ETSI TS 122 071 V11.0.0, pp. 1-50 (Oct. 2012).

Restriction and/or Election Requirement for U.S. Appl. No. 12/823,559 (dated Aug. 27, 2012).
Notice of Allowance and Fee(s) due for U.S. Appl. No. 12/581,739 (dated Aug. 8, 2012).
Non-Final Office Action for U.S. Appl. No. 13/047,287 (dated Jun. 6, 2012).
Notice of Allowance and Fee(s) Due and Examiner-Initiated Interview Summary for U.S. Appl. No. 12/581,739 (dated May 15, 2012).
Non-Final Office Action for U.S. Appl. No. 12/722,460 (dated Apr. 9, 2012).
"3rd Generation Partnership Project; Technical Specification Group Services and System Aspects; Telecommunication management; Charging management; Diameter charging applications (Release 11)," 3GPP TS 32.299, V11.3.0, pp. 1-150 (Mar. 2012).
"Net-Net Diameter Director," http://www.oracle.com/us/industries/communications/net-net-diameter-director-ds-1985034.pdf, pp. 1-9 (Copyright 2012).
Final Office Action for U.S. Appl. No. 12/581,739 (dated Dec. 30, 2011).
"3rd Generation Partnership Project; Technical Specification Group Core Network and Terminals; Policy and Charging Control (PCC) over Gx/Sd reference point (Release 11)," 3GPP TS 29.212, V11.3.0, pp. 1-171 (Dec. 2011).
Non-Final Office Action for U.S. Appl. No. 12/581,739 (dated Aug. 26, 2011).
Press Release, "SmartSynch SmartMeters Communicate Using the Largest and Most Available Wireless Networks in the World," http://www.smartsynch.com/SmartSynch_gprs.htm, pp. 1-2 (Downloaded from the Internet on Jul. 5, 2011).
"Solution: Itron CENTRON GPRS," Data Sheet, http://www.smartsynch.com/SmartSynch_itron_centron.htm, pp. 1-3 (Downloaded from the Internet on Jul. 5, 2011).
Myers, "SmartSynch Introduces Innovative 'DCX' Smart Grid Solution at DistribuTECH," SmartSynch News, http://www.appmesh.com/news/020309.htm, pp. 1-3 Feb. 3, 2009 (Downloaded from the Internet on Jul. 5, 2011).
"NES System Architecture," Data Sheet, Copyright 2009, pp. 1-2 (Downloaded from the Internet on Jul. 5, 2011).
"Wireless M-Bus and ZigBee®-enabled GSM/GPRS/ EDG Gateway for Smart Metering Introduced," Metering.com, http://www.metering.com/node/13550 Sep. 19, 2008, pp. 1-2 (Downloaded from the Internet on Jul. 5, 2011).
Notification of Transmittal of the Internatioanl Search Report and the Written Opinion of the International Searching Authority, or the Declaration for International Application No. PCT/US2010/027043 (dated Oct. 19, 2010)
"Draft LS on network verification of UE provided location," 3GPP TSG SA WG2 Meeting #81, pp. 1 (Oct. 11-15, 2010).
Notification of Transmittal of the International Search Report and the Written Opinion of the International Searching Authority, or the Declaration for International Application No. PCT/US2009/061187 (dated May 17, 2010).
Press Release, "Echelon and T-Mobile Announce Alliance to Reduce the Cost of a Secure Smart Grid Network for Utilities," Echelon Corp., http://www.3gamericas.org/index.cfm?fuseaction=pressreleasedisplay&pressreleaseid=2201, pp. 1-3 (Apr. 23, 2009).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 8)," 3GPP TS 29.272, V8.1.1, pp. 1-57 (Jan. 2009).
"3rd Generation Partnership Project; Technical Specification Group Core Network; Unstructured Supplementary Service Data (USSD); Stage 2 (Release 8)," 3GPP TS 23.090, V8.0.0, pp. 1-32 (Dec. 2008).
"3rd Generation Partnership Project; Technical Specification Group Services and System Aspects; Unstructured Supplementary Service Data (USSD)—Stage 1 (Release 8)," 3GPP TS 22.090, V8.0.0, pp. 1-10 (Dec. 2008).
"Digital cellular telecommunications system (Phase 2+); Universal Mobile Telecommunications System (UMTS); Circuit Switched

(56) References Cited

OTHER PUBLICATIONS (CS) fallback in Evolved Packet System (EPS); Stage 2 (3GPP TS 23.272 V 8.0.0 Release 8)," ETSI TS 123 272 V8.0.0, pp. 1-42 (Nov. 2008).
3rd Generation Partnership Project "Technical Specification Group Core Network and Terminals; Study into routeing of MT-SMs via the HPLMN (Release 7)," 3GPP TR 23.840 V7.1.0 (Mar. 2007).
Hakala et al., "Diameter Credit-Control Application," RFC 4006, pp. 1-115 (Aug. 2005).
Non-Final Office Action for U.S. Appl. No. 17/123,038 (dated Sep. 30, 2022).
Communication of European publication No. and information on the application of Article 67(3) EPC for European Patent Application Serial No. 20720580.8 (dated Jan. 19, 2022).
Non-Final Office Action for U.S. Appl. No. 17/175,260 (dated Aug. 29, 2022).
Notice of Allowance and Fee(s) Due and Examiner-Initiated Interview Summary for U.S. Appl. No. 16/929,048 (dated Aug. 24, 2022).
Notification of Transmittal of the International Search Report and the Written Opinion of the International Searching Authority or the Declaration for International Application No. PCT/US2022/026415 (dated Aug. 12, 2022).
Notice to Grant for Japanese Patent Application Serial No. 2021-545918 (dated Jun. 28, 2022).
"5G; Policy and Charging Control signaling flows and parameter mapping (3GPP TS 29.513 version 15.6.0 Release 15)," ETSI TS 129 513, V15.6.0, pp. 1-92 (Jan. 2020).
Final Office Action for U.S. Appl. No. 17/076,482 (dated Aug. 5, 2022).
Notice of Allowance and Fee(s) Due and Examiner-Initiated Interview Summary for U.S. Appl. No. 17/129,487 (dated Jul. 25, 2022).
Notice of Allowance and Fee(s) Due and Examiner-Initiated Interview Summary for U.S. Appl. No. 17/185,934 (dated Jul. 21, 2022).
Commonly-assigned, co-pending U.S. Appl. No. 17/185,934 for "Methods, Systems, and Computer Readable Media for Mitigating Location Tracking and Denial of Service (DoS) Attacks that Utilize Access and Mobility Management Function (AMF) Location Service," (Unpublished, filed Feb. 25, 2021).
Communication under Rule 71(3) EPC Intention to grant for European Application Serial No. 18 756 018.0 (dated Feb. 24, 2021).
Commonly-assigned, co-pending U.S. Appl. No. 17/175,260 for "Methods, Systems, and Computer Readable Media for Short Message Delivery Status Report Validation," (Unpublished, filed Feb. 12, 2021).
"3rd Generation Partnership Project; Technical Specification Group Services and System Aspects; Service requirements for the 5G system; Stage 1 (Release 18)," 3GPP TS 22.261, V18.1.1, pp. 1-85 (Jan. 2021).
"3rd Generation Partnership Project; Technical Specification Group Services and System Aspects; Procedures for the 5G System (5GS); Stage 2 (Release 16)," 3GPP TS 23.502, V16.7.1, pp. 1-603 (Jan. 2021).
Fajardo, V. et al., "Diameter Base Protocol, Internet Engineering Task Force (IETF)," RFC 6733, pp. 1-152 (Oct. 2012).
"3rd Generation Partnership Project; Technical Specification Group Core Network and Terminals; Numbering, addressing and identification; (Release 17)," 3GPP TS 23.003, V17.0.0, pp. 1-142 (Dec. 2020).
"3rd Generation Partnership Project; Technical Specification Group Services and System Aspects; Wireless and wireline convergence access support for the 5G System (5GS) (Release 16)," 3GPP TS 23.316, V16.6.0, pp. 1-83 (Dec. 2020).
"3rd Generation Partnership Project; Technical Specification Group Services and System Aspects; Security architecture and procedures for 5G system (Release 17)," 3GPP TS 33.501, V17.0.0, pp. 1-253 (Dec. 2020).

"3rd Generation Partnership Project; Technical Specification Group Core Network and Terminals; 5G System; Common Data Types for Service Based Interfaces; Stage 3 (Release 17)," 3GPP TS 29.571, V17.0.0, pp. 1-128 (Dec. 2020).
"3rd Generation Partnership Project; Technical Specification Group Core Network and Terminals; 5G System; Public Land Mobile Network (PLMN) Interconnection; Stage 3 (Release 16)," 3GPP TS 29.573, V16.5.0, pp. 1-98 (Dec. 2020).
"3rd Generation Partnership Project; Technical Specification Group Core Network and Terminals; 5G System; Location Management Services; Stage 3 (Release 16)," 3GPP TS 29.572, V16.5.0, pp. 1-77 (Dec. 2020).
"3rd Generation Partnership Project; Technical Specification Group Core Network and Terminals; 5G System; Access and Mobility Management Services; Stage 3 (Release 17)," 3GPP TS 29.518, V17.0.0, pp. 1-298 (Dec. 2020).
"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).
SMS Test Numbers: SMS Fake Delivery Receipts, Fake DLR—Tel!—SMS Test Platform and SMS services, Nov. 6, 2020, pp. 1-6, https://telqtele.com/sms-fake-delivery- receipts-fake-dlr/.
Communication of European publication number and information on the application of Article 67(3) EPC for European Application Serial No. 187560180 (dated May 13, 2020).
3rd Generation Partnership Project; Technical Specification Group Core Network and Terminals; T8 reference point for Northbound APIs, (Release 15), 3GPP TS 29.122, V15.6.0, pp. 1-300 (Dec. 2019).
DeKok, "The Network Access Identifier," Internet Engineering Task Force (IETF), RFC 7542, pp. 1- 30 (May 2015).
Croft, N., "On Forensics: A Silent SMS Attack,"Information and Computer Security Architectures (ICSA) Research Group, Department of Computer Science, pp. 1-4, University of Pretoria, South Africa (2012).
Constantin, L., "Remote SMS attack can force mobile phones to send premium-rate text messages: Applications installed by operators on SIM cards can be exploited remotely for SMS fraud and DoS purposes," IDG News Service, Dec. 19, 2011, pp. 1-5, IDG Communications, Inc., United States.
Non-Final Office Action for U.S. Appl. No. 17/009,683 (dated Jul. 15, 2022).
Decision to grant a European patent pursuant to Article 97(1) EPC for European Patent Application Serial No. 19710842.6 (dated Jun. 30, 2022).
Notice of Allowance for Chinese Application Serial No. 202080007649.X (dated Jun. 20, 2022).
Communication under Rule 71(3) EPC Intention to Grant for European Patent Application Serial No. 19 749 059.2 (May 16, 2022).
Notification of Transmittal of the International Search Report and the Written Opinion of the International Searching Authority or the Declaration for International Application No. PCT/US2021/042853 (dated Oct. 18, 2021).
Advisory Action and Applicant-Initiated Interview Summary for U.S. Appl. No. 17/099,683 (dated May 23, 2022).
"Edge Router (DEA)," Mavenir, pp. 1-7 (2017).
Press Release, "Echelon and T-Mobile Announce Alliance to Reduce the Cost of a Secure Smart Grid Network for Utilities," Echelon Corp., https://www.tdworld.com/smart- utility/article/20956244/echelon-and-tmobile-announce-alliance-to-reduce-the-cost-of-a-secure-smart-grid-network-for-utilities, p. 1-10 (May 14, 2009).
Applicant-Initiated Interview Summary for U.S. Appl. No. 17/123,038 (dated May 30, 2023).
Applicant-Initiated Interview Summary for U.S. Appl. No. 17/099,683 (dated Apr. 17, 2023).
Final Office Action for U.S. Appl. No. 17/099,683 (dated Apr. 6, 2023).
Applicant-Initiated Interview Summary for U.S. Appl. No. 17/099,683 (dated Apr. 5, 2023).
Notice of Allowance and Fee(s) Due for U.S. Appl. No. 17/008,528 (dated Mar. 30, 2023).

(56) References Cited

OTHER PUBLICATIONS

Final Office Action for U.S. Appl. No. 17/123,038 (dated Mar. 9, 2023).
Office Communication for U.S. Appl. No. 17/125,943 (dated Mar. 1, 2023).
Notice of Allowance and Fee(s) Due for U.S. Appl. No. 17/175,260 (dated Feb. 27, 2023).
Applicant Initiated Interview Summary for U.S. Appl. No. 17/008,528 (dated Feb. 21, 2023).
Intent to Grant for Japanese Patent Application No. 2020-572898 (dated Feb. 14, 2023).
Intent to Grant for Japanese Patent Application No. 2021-506739 (Jan. 24, 2023).
Notice of Allowance and Fee(s) Due for U.S. Appl. No. 17/319,023 (dated Feb. 10, 2023).
Non-Final Office Action for U.S. Appl. No. 17/125,943 (dated Feb. 9, 2023).
Supplemental Notice of Allowability for U.S. Appl. No. 17/076,482 (dated Jan. 19, 2023).
Intent to Grant for European Patent Application No. 187052709 (dated Dec. 8, 2022). Ap
Applicant Initiated Interview Summary for U.S. Appl. No. 17/319,023 (dated Jan. 10, 2023).
Non-Final Office Action for U.S. Appl. No. 17/099,683 (dated Jan. 4, 2023).
"5G; 5G System; Public Land Mobile Network (PLMN) Interconnection; Stage 3 (3GPP TS 29.573 Version 16.3.0 Release 16)," ETSI TS 129 573, V16.3.0, pp. 1-93 (Jul. 2020).
Communication under Rule 71 (3) EPC Intention to Grant for European Patent Application Serial No. 207205808 (dated Dec. 23, 2022).
Non-Final Office Action for U.S. Appl. No. 17/095,420 (dated Jan. 3, 2023).
Applicant-Initiated Interview Summary for U.S. Appl. No. 17/099,683 (dated Dec. 12, 2022).
Notice of Allowance and Fee(s) Due for U.S. Appl. No. 17/076,482 (dated Dec. 1, 2022).
Notice to Grant for Japanese Patent Application Serial No. 2021-500828 (dated Nov. 25, 2022).
Examination Report for Indian Application Serial No. 202247032585 (dated Nov. 15, 2022).
Non-Final Office Action for Chinese Patent Application Serial No. 202080091056.6 (dated Oct. 27, 2022).
Non-Final Office Action for U.S. Appl. No. 17/008,528 (dated Nov. 10, 2022).
Notification of reasons for refusal for Japanese Patent Application No. 2020-572898 (dated Oct. 25, 2022).
Advisory Action for U.S. Appl. No. 17/076,482 (dated Oct. 25, 2022).
Final Office Action and Applicant-Initiated Interview Summary for U.S. Appl. No. 17/099,683 (dated Oct. 24, 2022).
Communication of European publication number and information on the application of Article 67(3) EPC for European Patent Application No. 20842462.2 (dated Oct. 12, 2022).
Decision to grant a European patent pursuant to Article 97(1) EPC for European Patent Application Serial No. 19749059.2 (dated Sep. 29, 2022).
Decision to Grant for Japanese Patent Application Serial No. 2020-505462 (dated Aug. 2, 2022).
Non-Final Office Action for U.S. Appl. No. 17/319,023 (dated Sep. 28,2022).
"5G; Architecture enhancements for 5G System (5GS) to support network data analytics services (3GPP TS 23.288 version 16.4.0 Release 16)," ETSI TS 123 288 V16.4.0, pp. 1-68 (Jul. 2020).
Supplemental Notice of Allowability for U.S. Appl. No. 17/175,260 (dated Mar. 8, 2023).
Applicant-Initiated Interview Summary for U.S. Appl. No. 17/095,420 (dated May 17, 2023).
Applicant-Initiated Interview Summary for U.S. Appl. No. 17/095,420 (dated May 12, 2023).
Notice of Publication for European Patent Application 21718461.3 (dated Apr. 26, 2023).
Decision to Grant for European Patent Application 20720580.8 (dated May 11, 2023).
Notice of Allowance and Fee(s) Due for U.S. Appl. No. 17/099,683 (dated May 8, 2023).
Office Action for Chinese Patent Application Serial No. 202080091056.6 (dated Mar. 25, 2023).

\* cited by examiner

METHODS, SYSTEMS, AND COMPUTER READABLE MEDIA FOR MITIGATING SPOOFING ATTACKS ON SECURITY EDGE PROTECTION PROXY (SEPP) INTER-PUBLIC LAND MOBILE NETWORK (INTER-PLMN) FORWARDING INTERFACE

PRIORITY CLAIM

This application claims the priority benefit of Indian Provisional Patent Application Serial No. 202041047779, filed Nov. 2, 2020, and is a continuation in part of U.S. patent application Ser. No. 17/095,420, filed Nov. 11, 2020, which claims the priority benefit of Indian Provisional Patent Application Serial No. 202041041754, filed Sep. 25, 2020, the disclosures of which are incorporated herein by reference in their entireties.

TECHNICAL FIELD

The subject matter described herein relates to enhancing security in 5G communication networks. More particularly, the subject matter described herein relates to methods, systems, and computer readable media for mitigating spoofing attacks on an SEPP inter-PLMN forwarding interface.

BACKGROUND

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and SCP load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages.

One vulnerability that exists with the current 5G network architecture occurs on the N32 interface, which is the interface between SEPPs. As indicated above, an SEPP acts as the security screening node for a public land mobile network (PLMN). The N32 control or N32-c interface is used for the exchange of control messages with a remote SEPP. Initiation of communications on the N32-c interface involves a transport layer security (TLS) handshake procedure to establish a TLS connection for the exchange of N32 control messages. After the exchange of N32-c messages, a second TLS handshake occurs to establish a second TLS connection for the N32 forwarding or N32-f interface. The only validation that occurs on the N32-f interface is whether the TLS certificate is valid and issued by a trusted certificate authority. As a result, a hacker SEPP can spoof the identity of a real SEPP and engage in unauthorized service communications on the forwarding interface with the PLMN protected by the SEPP. There is also no validation of the PLMN in service messages received over the inter-PLMN forwarding interface.

In light of these and other difficulties, there exists a need for methods, systems, and computer readable media for mitigating spoofing attacks on an SEPP inter-PLMN forwarding interface.

SUMMARY

A method for mitigating spoofing attacks on a security edge protection proxy (SEPP) inter-public land mobile network (inter-PLMN) forwarding interface includes obtaining, by a responding SEPP and from at least one message received over an inter-PLMN control interface, at least one of a first SEPP identifier and a first PLMN identifier. The method further includes storing the at least one of the first SEPP identifier and the first PLMN identifier in an SEPP inter-PLMN forwarding interface identity cross-validation database. The method further includes obtaining, by the responding SEPP and from at least one message received over an inter-PLMN forwarding interface, at least one of a second SEPP identifier and a second PLMN identifier. The method further includes performing a lookup in the SEPP inter-PLMN forwarding interface identity cross-validation database using a lookup key comprising the at least one of the second SEPP identifier and the second PLMN identifier. The method further includes determining that a record corresponding to the lookup key is not present in the SEPP inter-PLMN forwarding interface identity cross-validation database, and, in response, preventing the at least one message received over the inter-PLMN forwarding interface from entering a PLMN protected by the responding SEPP.

According to another aspect of the subject matter described herein, the inter-PLMN control interface comprises an N32-c interface and the inter-PLMN forwarding interface comprises an N32-f interface.

According to another aspect of the subject matter described herein, obtaining at least one of the first SEPP identifier and the first PLMN identifier from the at least one message received over the inter-PLMN control interface includes obtaining the first SEPP identifier from a first certificate contained in a first transport layer security (TLS) certificate message received over the inter-PLMN control interface during a TLS handshake for establishing a first TLS connection for the N32-c interface.

According to another aspect of the subject matter described herein, the first certificate comprises a first X.509 certificate.

According to another aspect of the subject matter described herein, obtaining the first SEPP identifier includes extracting the first SEPP identifier from a subject alternative names extension of the first X.509 certificate.

According to another aspect of the subject matter described herein, obtaining at least one of the second SEPP identifier and the second PLMN identifier from at least one message received over the inter-PLMN forwarding interface includes obtaining the second SEPP identifier from a second certificate contained in a second TLS certificate message received during a TLS handshake for establishing a second TLS connection for the N32-f interface.

According to another aspect of the subject matter described herein, the second certificate comprises a second X.509 certificate.

According to another aspect of the subject matter described herein, obtaining the second SEPP identifier includes extracting the second SEPP identifier from a subject alternative names extension of the second X.509 certificate.

According to another aspect of the subject matter described herein, obtaining the first SEPP identifier and the first PLMN identifier from at least one message received over the inter-PLMN control interface comprises obtaining the first SEPP identifier from a first TLS certificate message received during a TLS handshake for setting up a first TLS connection for the inter-PLMN control interface and obtaining the first PLMN identifier from an N32-c security capability exchange message received over the first TLS connection and obtaining the second SEPP identifier and the second PLMN identifier from at least one message associated received over the inter-PLMN forwarding interface comprises obtaining the second SEPP identifier from a second TLS certificate message received during a TLS handshake for setting up a second TLS connection for the inter-PLMN forwarding interface and obtaining the second PLMN identifier from a 5G service message received over the second TLS connection.

According to another aspect of the subject matter described herein, the lookup key comprises a tuple including the second SEPP identifier and the second PLMN identifier.

According to another aspect of the subject matter described herein, a system for mitigating spoofing attacks on a security edge protection proxy (SEPP) inter-public land mobile network (inter-PLMN) forwarding interface is provided. The system includes a security edge protection proxy (SEPP) including at least one processor and a memory. The system further includes an SEPP inter-PLMN forwarding interface identity cross-validation database residing in the memory. The system further includes an inter-PLMN forwarding interface identity spoofing mitigation module implemented by the at least one processor and configured to: obtain, from at least one message received over an inter-PLMN control interface, at least one of a first SEPP identifier and a first PLMN identifier; store the at least one of the first SEPP identifier and the first PLMN identifier in an SEPP inter-PLMN forwarding interface identity cross-validation database; obtain, from at least one message received over an inter-PLMN forwarding interface, at least one of a second SEPP identifier and a second PLMN identifier; perform a lookup in the SEPP inter-PLMN forwarding interface identity cross-validation database using a lookup key comprising the at least one of the second SEPP identifier and the second PLMN identifier; determine that a record corresponding to the lookup key is not present in the SEPP inter-PLMN forwarding interface identity cross-validation database, and, in response, prevent the at least one message received over the inter-PLMN forwarding interface from entering a PLMN protected by the SEPP.

According to another aspect of the subject matter described herein, the inter-PLMN forwarding interface identity spoofing mitigation module is configured to extract the first SEPP identifier from a subject alternative names extension of the first X.509 certificate.

According to another aspect of the subject matter described herein, the second certificate comprises a second X.509 certificate and the inter-PLMN forwarding interface identity spoofing mitigation module is configured to obtain the second identifier includes by extracting the second identifier from a subject alternative names extension of the X.509 certificate.

According to another aspect of the subject matter described herein, a non-transitory computer readable medium having stored thereon executable instructions that when executed by a processor of a computer to perform steps is provided. The steps include obtaining, by a responding security edge protection proxy (SEPP) and from at least one message received over an inter-public land mobile network (inter-PLMN) control interface, at least one of a first SEPP identifier and a first PLMN identifier. The steps further include storing the at least one of the first SEPP identifier and the first PLMN identifier in an SEPP inter-PLMN forwarding interface identity cross-validation database. The steps further include obtaining, by the responding SEPP and from at least one message received over an inter-PLMN forwarding interface, at least one of a second SEPP identifier and a second PLMN identifier. The steps further include performing a lookup in the SEPP inter-PLMN forwarding interface identity cross-validation database using a lookup key comprising the at least one of the second SEPP identifier and the second PLMN identifier. The steps further include determining that a record corresponding to the lookup key is not present in the SEPP inter-PLMN forwarding interface identity cross-validation database, and, in response, preventing the at least one message received over the inter-PLMN forwarding interface from entering a PLMN protected by the responding SEPP.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
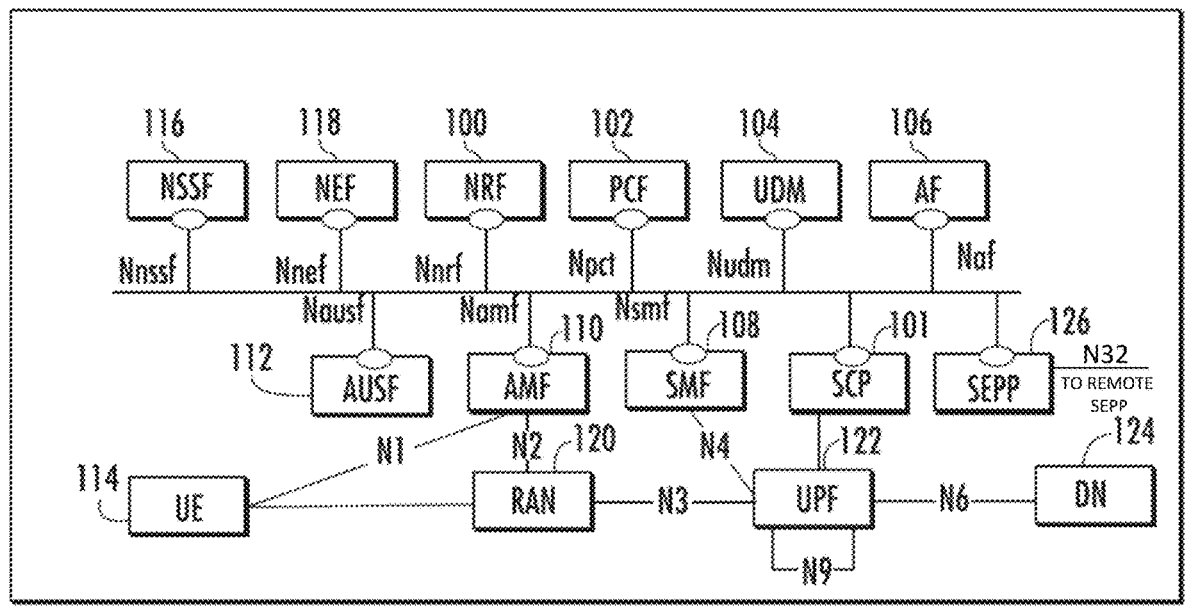
FIG. 1 is a network diagram illustrating an exemplary 5G network architecture.

The subject matter described herein relates to methods, systems, and computer readable media for mitigating 5G roaming spoofing attacks on an inter-PLMN forwarding interface of an SEPP. FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

As stated above, one problem with the existing 5G architecture is that there is no validation of the SEPP identity or PLMN identity presented on the inter-PLMN forwarding interface of the SEPP. In the absence of validation of the SEPP identity or the PLMN on the inter-PLMN forwarding interface, a malicious SEPP can try to spoof the identity of another SEPP or PLMN identity and launch security attacks, including denial of service attacks, using service traffic transmitted over the forwarding interface. The responding SEPP does not validate whether the SEPP or PLMN identity presented on the inter-PLMN forwarding interface is from a legitimate initiating SEPP and/or PLMN. As used herein, the term "initiating SEPP" refers to the SEPP that requests the TLS connections on the inter-PLMN control interface and inter-PLMN forwarding interface. The term "responding SEPP" refers to the SEPP that receives requests for TLS connections on the inter-PLMN control interface and the inter-PLMN forwarding interface. The subject matter described herein addresses this and other difficulties by cross-validating the identity of an SEPP with presented on the inter-PLMN forwarding interface with an identity of the SEPP presented on the inter-PLMN control interface.

In the 3GPP network architecture, the SEPP is the proxy for inter-PLMN control messages. According to 3GPP TS 33.501, the SEPP provides message protection, mutual authentication, key management, topology hiding, access control, discarding of malformed N32 signaling messages, rate limiting, and anti-spoofing. The subject matter described herein includes an implementation of anti-spoofing for communications on the N32-f interface.

Figure 2:
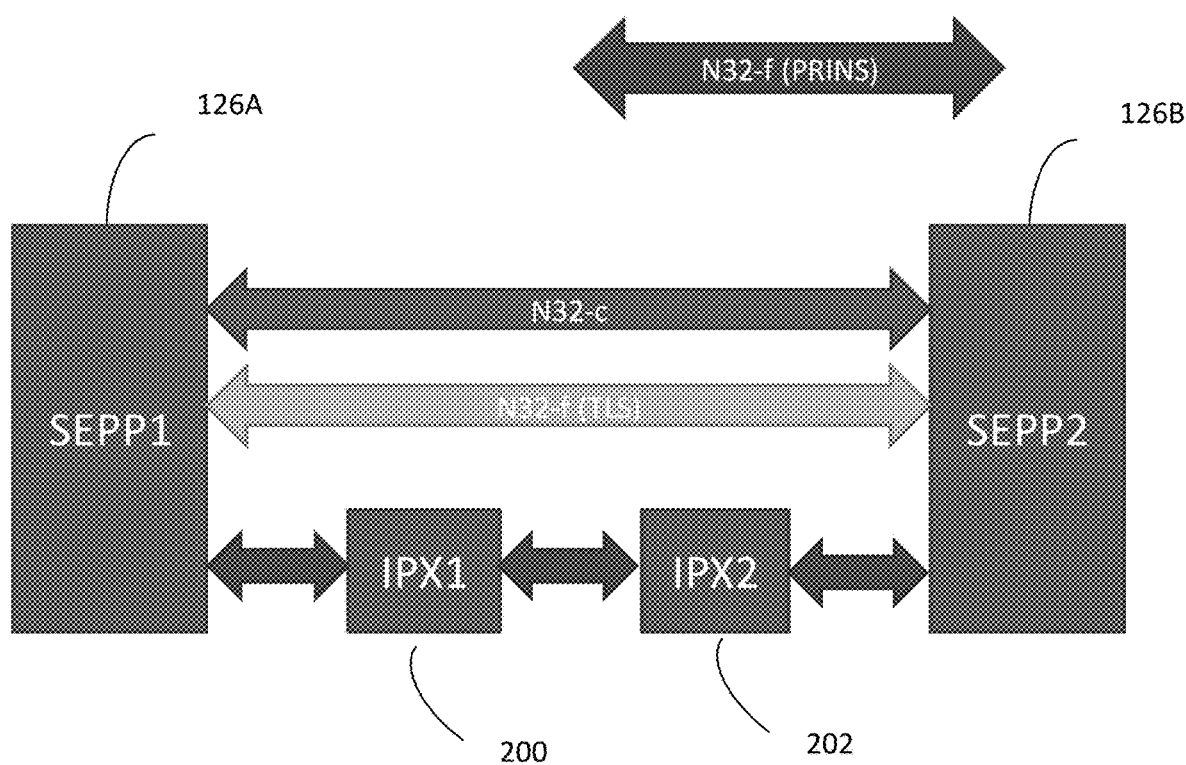
FIG. 2 is a network diagram illustrating two SEPPs and the interfaces between the SEPPs.

FIG. 2 illustrates SEPPs and interfaces between the SEPPs. Referring to FIG. 2, SEPP 126A and SEPP 126B communicate over the N32 interface. The N32 interface includes two different interfaces, the N32-c interface and the N32-f interface. The N32-c interface is a control plane interface between SEPPs for performing an initial handshake and negotiating the parameters to be applied during N32 message forwarding. The N32-f interface is a forwarding interface between SEPPs which is used for forwarding communications between NF service consumers and NF service producers after applying application level security protection.

In addition to the N32 interface, FIG. 2 also illustrates the PRINS interface. The PRINS interface is used to forward messages between SEPPs 126A and 126B via one or more IP exchange (IPX) providers 200 and 202. However, it is the N32-c and N32-f TLS connections that are of interest to the subject matter described herein.

Figure 3:
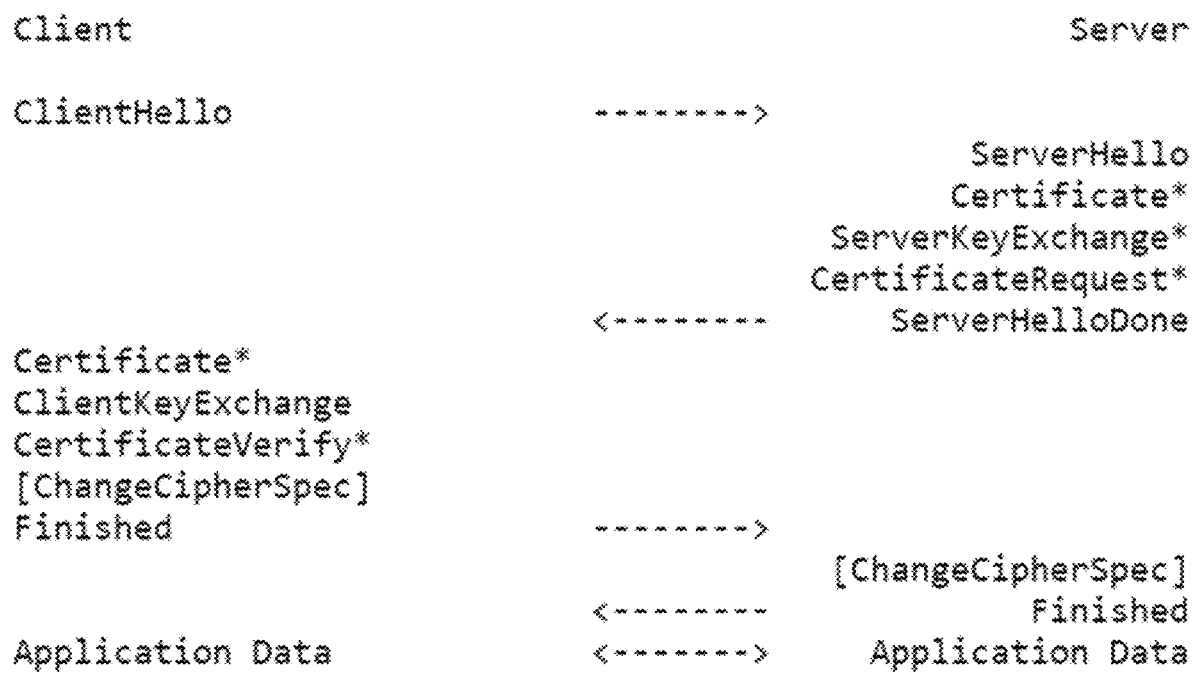
FIG. 3 is a message flow diagram illustrating exemplary messages exchanged between a client and a server in a TLS handshake.

For secure communications, separate TLS connections are established on the N32-c and N32-f interfaces. FIG. 3 illustrates exemplary messages exchange between a client and a server in a TLS handshake used to establish a TLS connection. In FIG. 3, the client sends a ClientHello message to the server. The server then sends ServerHello, Certificate, ServerKeyExchange, CertificateRequest and ServerHelloDone message to the client. In response to these messages, the client sends a Certificate message, ClientKeyExchange message, CertificateVerify message, and Finished message to the server. It is the certificate message from the client to the server that a responding SEPP (acting as the server for purposes of TLS connection establishment) described herein uses to obtain an X.509 certificate. For verifying the identity of an initiating SEPP. In one example, the sender's identity extracted from the X.509 certificate of the TLS handshake for establishing the TLS connection for N32-c communications may be used to cross validate the sender's N32-f identity. As stated above, the TLS handshake protocol is defined in Internet Engineering Task Force (IETF) Request for Comments (RFC) 5246 and includes the exchange of certificate messages by both ends of the TLS connection. The structure of a TLS handshake message defined in IETF RFC 5246, including the certificate message, appears below:

```
enum {
    hello_request(0), client_hello(1), server_hello(2),
    certificate(11), server_key_exchange (12),
    certificate_request(13), server_hello_done(14),
    certificate_verify(15), client_key_exchange(16),
    finished(20), (255)
} HandshakeType;
struct {
    HandshakeType msg_type;      /* handshake type */
    uint24 length;                /* bytes in message */
    select (HandshakeType) {
        case hello_request:       HelloRequest;
        case client_hello:        ClientHello;
        case server_hello:        ServerHello;
        case certificate:         Certificate;
        case server_key_exchange: ServerKeyExchange;
        case certificate_request: CertificateRequest;
        case server_hello_done:   ServerHelloDone;
        case certificate_verify:  CertificateVerify;
        case client_key_exchange: ClientKeyExchange;
        case finished:            Finished;
    } body;
} Handshake;
```

As illustrated by the TLS handshake message structure, one of the defined handshake message types is the certificate message, which contains the certificate of the client or server, depending on whether the sender is functioning as a client or a server. In establishing secure TLS communications over the N32-c interface, mutual TLS or m-TLS is used where both ends of the TLS connection receive and validate the other end's X.509 certificate. IETF RFC 5246 indicates that the type of certificate must be X.509v3 unless expressly negotiated otherwise. The examples described herein use the X.509v3 certificate as an example, but the subject matter described herein is not limited to only using the identity of the sender extracted from an X.509v3 certificate to validate an N32-f identity of a sender. The X.509v3 certificate format is defined in IETF RFC 3280. According to IETF RFC 3280, one extension or parameter that may be included in an X.509v3 certificate is the subject alternative names extension. The subject alternative names extension is defined as follows:

The subject alternative names extension allows additional identities to be bound to the subject of the certificate. Defined options include an Internet electronic mail address, a DNS name, an IP address, and a uniform resource identifier (URI). Other options exist, including completely local definitions. Multiple name forms, and multiple instances of each name form, MAY be included. Whenever such identities are to be bound into a certificate, the subject alternative name (or issuer alternative name) extension MUST be used; however, a DNS name MAY be represented in the subject field using the domainComponent attribute as described in section 4.1.2.4. Because the subject alternative name is considered to be definitively bound to the public key, all parts of the subject alternative name MUST be verified by the CA.

As indicated above, the subject alternative names extension of the X.509v3 certificate may contain a DNS name, IP address, or a URI that identifies the subject of the certificate and that is verified by the certificate authority. Because the subject alternative name is verified by the certificate authority, the subject alternative name is difficult to spoof. However, simply ensuring that a sender has a valid X.509 certificate does not validate the identity of the sender at the N32-f application level. To perform such cross-validation, responding SEPP 126B may extract the identity of the sender from the certificate message used to establish the TLS connection for N32-c communications, extract the identity of the sender from the certificate message used to establish the TLS connection for N32-f communications, and compare these identities. If the identities match, responding SEPP 126B may perform a further validation step of comparing the identity extracted from either certificate message with a database of configured peer SEPP identities. If either validation fails, the responding SEPP may block inter-PLMN communications associated with the TLS connection for N32-f communications.

Figure 4:
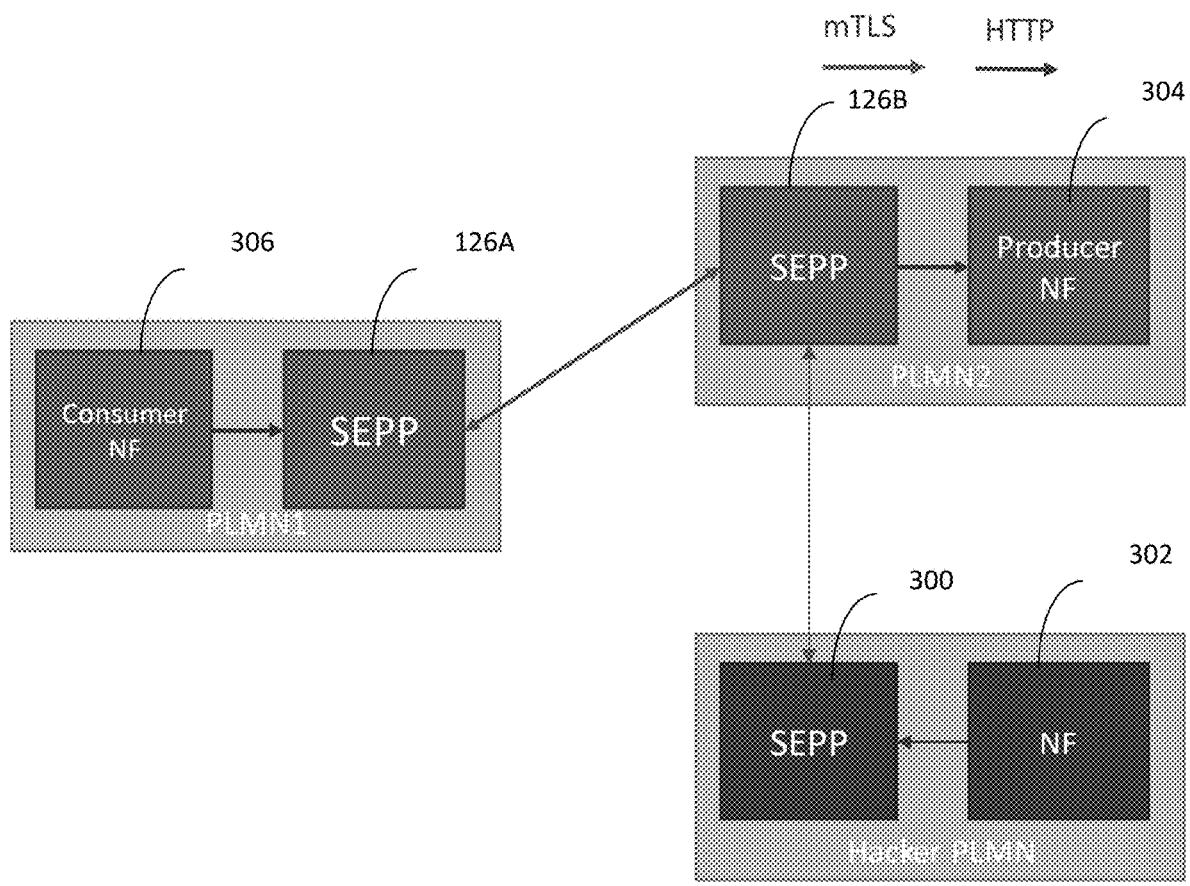
FIG. 4 is a network diagram illustrating a hacker impersonating an SEPP.

FIG. 4 illustrates and exemplary attack scenario that can occur if there is no cross-validation of identities used on the N32-c and N32-f interfaces. In FIG. 4, an initiating SEPP 126A located in PLMN1 may establish a TLS connection on the N32-c interface with responding SEPP 126B. A hacker SEPP 300 located in PLMN3 may establish a TLS connection for N32-f communications with SEPP 126B. Because there is no cross-validation of the identity used in the TLS connection for the N32-f communications with the identity used in the TLS connection for the N32-c communications. Hacker SEPP 300 and hacker NF 302 located in PLMN3 can send attack traffic to responding SEPP 126B and producer NF 304 located in PLMN2. In one example, such attack traffic may be used to implement a denial of service attack that prevents consumer NF 306 located in PLMN1 from obtaining service from producer NF 304.

Figure 5:
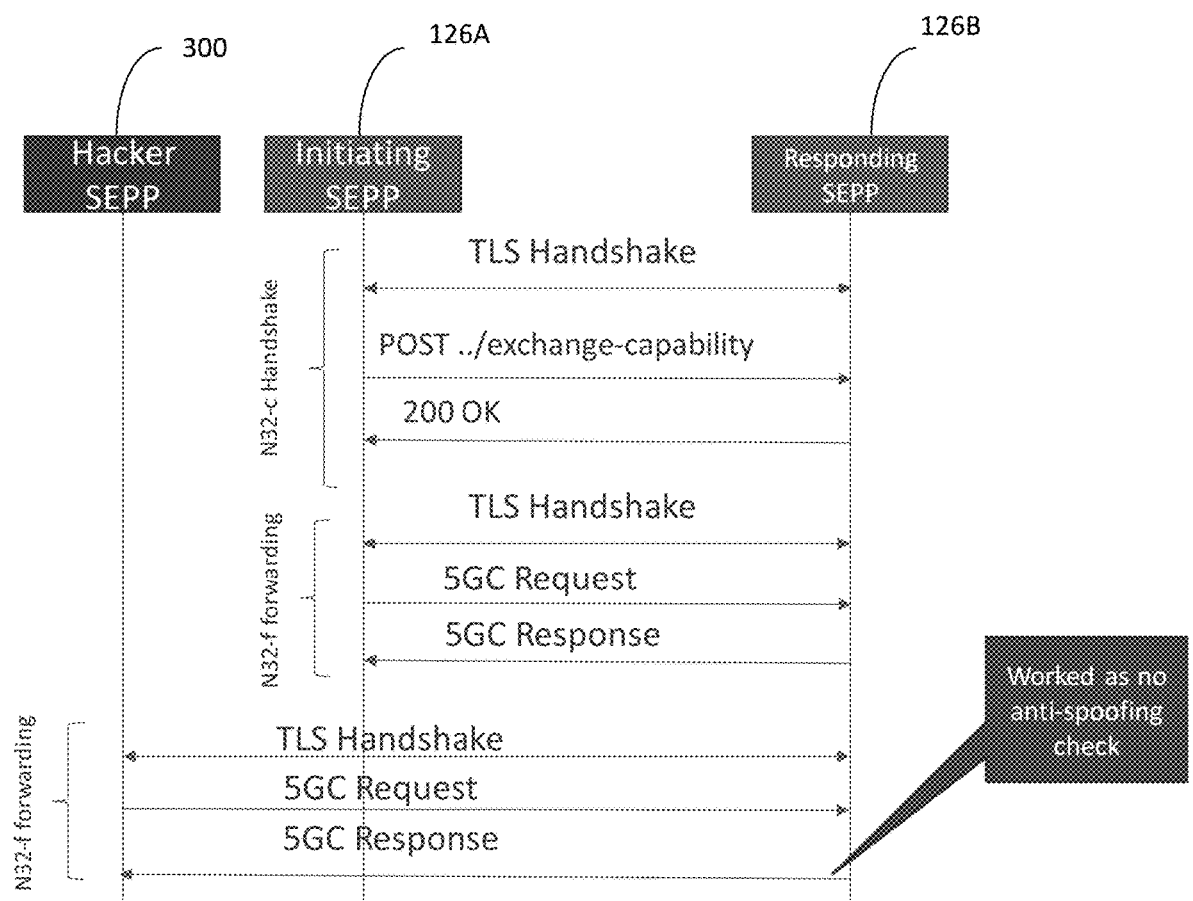
FIG. 5 is a message flow diagram illustrating exemplary messages exchanged between SEPPs when an attacker SEPP successfully impersonates a legitimate SEPP on the N32-f interface.

FIG. 5 illustrates an attack scenario for N32-f communications in more detail. In FIG. 5, a TLS connection is established for N32-c communications between initiating SEPP 126A and responding SEPP 126B. After the TLS connection is established for N32-c communications, initiating SEPP 126A and responding SEPP 126B exchange N32-c securities capability messages over the TLS connection.

Once the N32-c connection is established, initiating SEPP 126A and responding SEPP 126B perform a second TLS handshake for N32-f communications. Once the second TLS connection is established, initiating SEPP 126A and responding SEPP 126B may exchange 5G service request and response messages between consumer and producer NFs in their respective PLMNs.

Because there is no cross-validation of N32-f TLS identities with N32-c TLS identities, hacker SEPP 300 can it initiate a TLS handshake with responding SEPP 126B. Responding SEPP 126B checks to see if the certificate was issued by a valid certificate authority. However, there is no cross-validation with identities obtained on other interfaces. As a result, hacker SEPP 300 can establish a TLS connection for N32-f communications and send 5G request messages to producer NFs in the network protected by responding SEPP 126B pretending to be SEPP 126A, which may cause a denial of service or other issues in the PLMN protected by responding. SEPP 126B.

Figure 6:
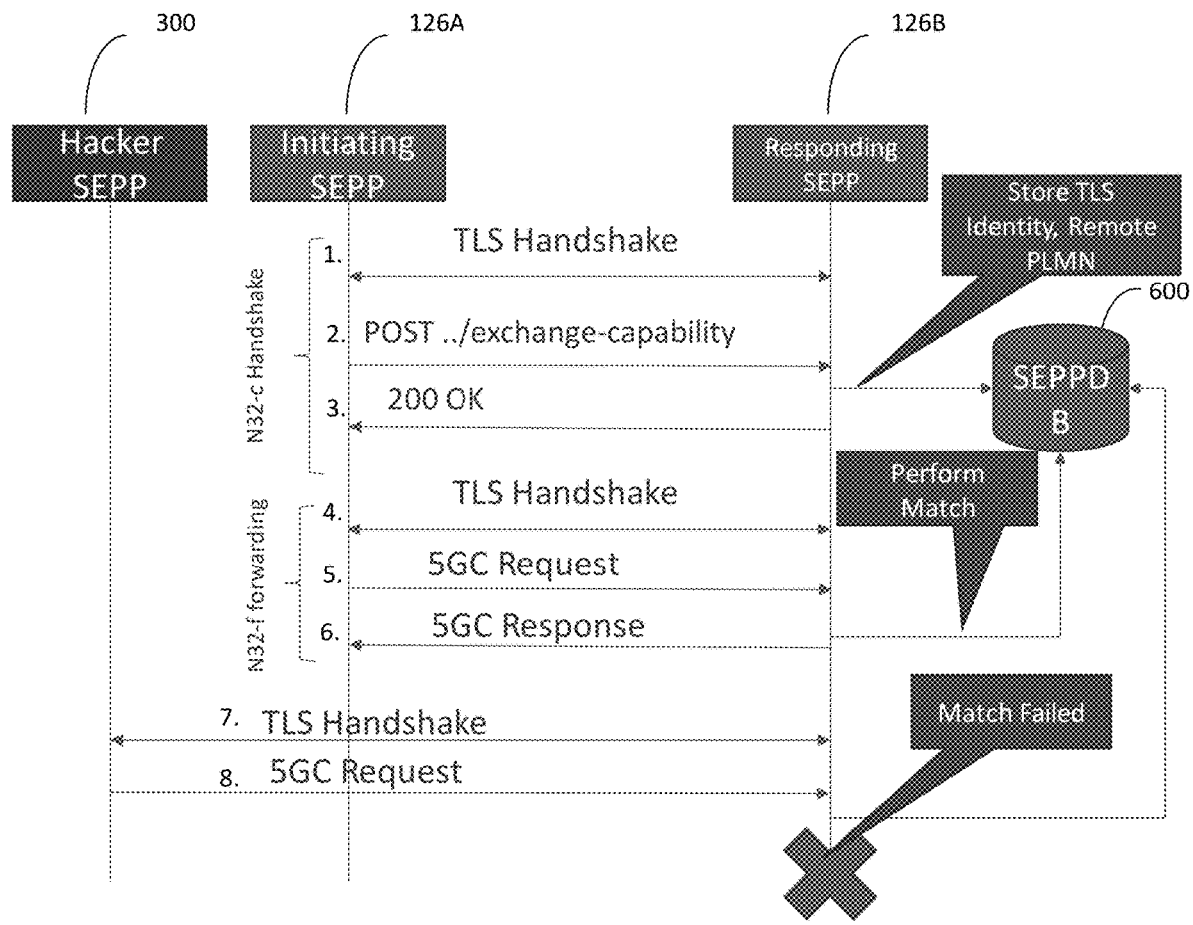
FIG. 6 is a message flow diagram illustrating the screening of an SEPP identity presented on the N32-f interface.

To protect against this type of attack, responding SEPP 126B may store the identity of an initiating SEPP received on the N32-c interface and use that identity to cross-validate the identity of an initiating SEPP in a TLS connection for N32-f communications. FIG. 6 illustrates the cross-validation that may be performed by a responding SEPP. Referring to FIG. 6, in line 1, initiating SEPP 126A and responding SEPP 126B exchange TLS messages for establishing a TLS connection for N32-c communications. In lines 2 and 3, initiating SEPP 126A and responding SEPP 126B exchange N32-c, securities capability exchange messages.

After line 2, responding. SEPP 126B may store the identity of initiating SEPP 126A extracted from the X-509 certificate for the first TLS connection and the PLMN of initiating SEPP 128C from the N32-c security capability exchange message from line 2 in an SEPP inter-PLMN forwarding interface identity cross-validation database 600. Responding SEPP 126B may use the identities stored in SEPP inter-PLMN forwarding interface identity cross-validation database 600 to validate N32-f identities presented by initiating SEPPs.

Since SEPP 126B is the responding SEPP for purposes of the N32-c security capability negotiation transaction, responding SEPP 126B may extract the N32-c identity from the sender ID attribute of an N32-c SecNegotiateReqData information element of an HTTP POST message from initiating SEPP 126A. Table 1 and 2 below corresponds to Tables 6.1.5.2.2.1 of 3GPP TS 29.573, which illustrates the attributes that may be included in the SecNegotiateReqData information element that is part of the N32-c security capability negotiation.

TABLE 1

| Definition of type SecNegotiateReqData | | | | |
|---|---|---|---|---|
| Attribute name | Data type | P | Cardinality | Description |
| sender | Fqdn | M | 1 | This IE shall uniquely identify the SEPP that is sending the request. This IE is used to store the negotiated security capability against the right SEPP. |
| supportedSecCapabilityList | array(Security Capability) | M | 1 . . . N | This IE shall contain the list of security capabilities that the requesting SEPP supports. |

As can be seen from Table 1, the sender attribute is a mandatory parameter of both the SecNegotiateReqData information element and contains the FQDN of the SEPP that sends the request. The PLMN of the SEPP can be obtained from the FQDN of the sending SEPP. For example, if the FQDN of the sending SEPP is sepp1.5gc.mnc123.mcc456.3gppnetwork.org, then the PLMN portion of the FQDN is 5gc.mnc123.mcc456.3gppnetwork.org. As will be described in detail below, the PLMN of the sender is included in 5G core (5GC) or service messages exchanged on the N32-f interface and can be used to validate the subsequent 5GC messages even if the TLS identities used for N32-c and N32-f communications match. This additional check prevents an SEPP that is identified as trusted in the first check from sending a false PLMN identity in subsequent messages exchanged on the forwarding interface. In line 4, initiating SEPP 126A initiates a TLS handshake with responding SEPP 126B for N32-f communications. Responding SEPP 126B may extract the identity of initiating SEPP 126A from the X.509 certificate used for the second TLS handshake. Responding SEPP 126B may perform a lookup in SEPP inter-PLMN forwarding interface identity cross-validation database 600 to determine whether the identity of initiating SEPP 126A for the N32-c communications matches the identity presented on the N32-f interface. In this example, the identities match. As a result, in lines 5 and 6, initiating SEPP 126A sends a 5G service request message to responding SEPP 126B, and responding SEPP 126B sends a 5G service response message to initiating SEPP 126A.

In line 7, hacker SEPP 300 sends messages to responding SEPP 126B to initiate a TLS connection for N32-f communications with responding SEPP 126B. Responding SEPP 126B extracts the identity presented by hacker SEPP 300 for the TLS connection from the X.509 certificate of the certificate message in the TLS handshake procedure. Responding SEPP 126B performs a lookup in database 600 and does not find the identity presented by hacker SEPP 300 to be present in database 600. Because the identity presented by hacker SEPP 300 is not present in database 600, the cross-validation fails, and responding SEPP 300 blocks the 5G service request message from the hacker PLMN in line 8. In another example, responding SEPP 126B may receive the 5G service request message in line 8, extract the PLMN identity from the 5G service request message, and perform a lookup in database 600 using a lookup key that includes both the N32-c TLS SEPP identity and the N32-c the PLMN identity. If a record corresponding to the lookup key is not present in database 600, responding SEPP 126B may prevent inter-PLMN traffic received on the TLS connection for the N32-f interface from entering the PLMN.

Figure 7:
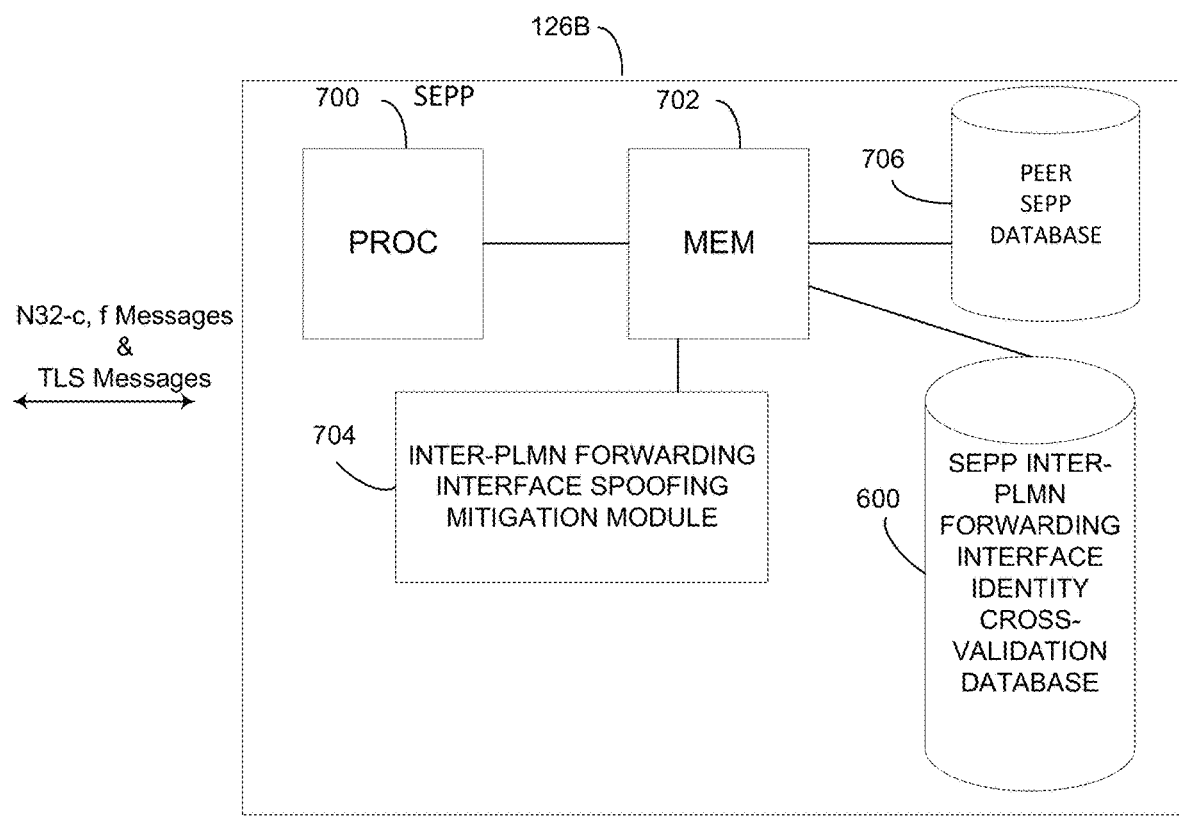
FIG. 7 is a block diagram illustrating an exemplary architecture of an SEPP for mitigating spoofing attacks on an SEPP inter-PLMN forwarding interface.

FIG. 7 is a block diagram illustrating an exemplary architecture for responding SEPP 126B. SEPP 126B includes at least one processor 700 and a memory 702. SEPP 126B further includes an inter-PLMN forwarding interface spoofing mitigation module 704 that performs the steps described herein for cross-validating the TLS identity presented by an SEPP on the N32-c interface with identities presented by real or hacker SEPPs on the N32-f interface. Inter-PLMN forwarding interface spoofing mitigation module 704 may also cross-validate the PLMN presented by an SEPP on the N32-c interface with the PLMN presented by an SEPP on the N32-f interface. SEPP 126B further includes SEPP inter-PLMN forwarding interface identity cross-validation database 600 that is dynamically populated by inter-PLMN forwarding interface spoofing mitigation module 704 with identities and/or PLMNs of SEPPs obtained on the N32-c interface. SEPP 126B may use the SEPP identities and/or the PLMN identities stored in SEPP forwarding interface identity cross-validation database 600 to cross-validate TLS level SEPP identities and/or service level PLMN identities presented on the N32-f interface.

SEPP 126B may also include a peer SEPP database 706 that is configured with identities of peer SEPPs with which inter-PLMN communications are allowed. inter-PLMN forwarding interface spoofing mitigation module 704 may be implemented by processor 700 and may also perform a cross check of the N32-f identity presented by a remote node against the peer SEPP identities stored in database 706. If the identity of a remote node presented in a certificate exchanged during TLS connection establishment for an N32-f interface is not present in database 706 or if the cross check between the N32-c and N32-f identities fails, inter-PLMN forwarding interface spoofing mitigation module 704 may block inter-PLMN communications with the remote node. If both identity cross checks pass, inter-PLMN forwarding interface spoofing mitigation module 704 may allow inter-PLMN communications with the remote node.

Figure 8:
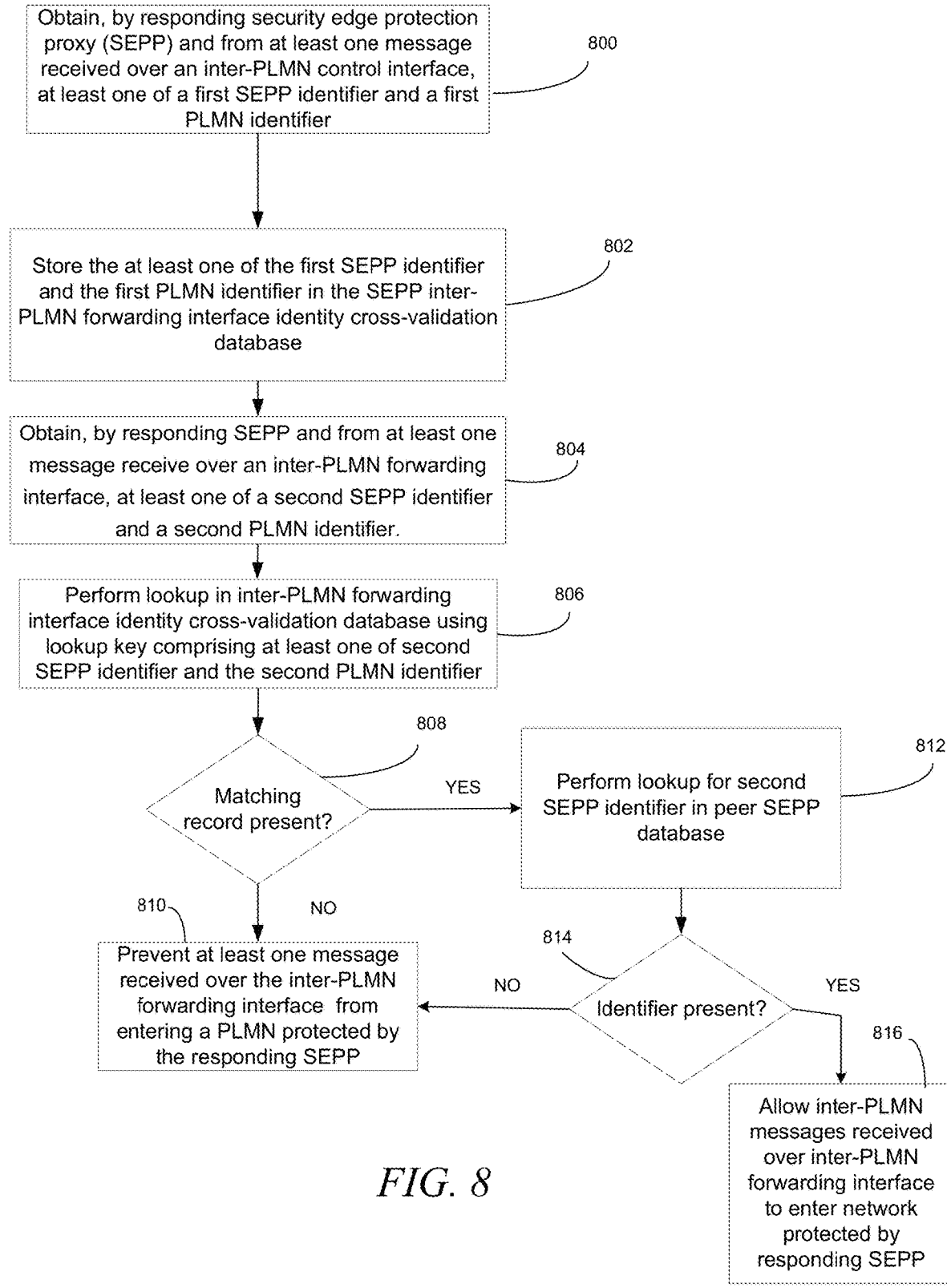
FIG. 8 is a flow chart illustrating an exemplary method for mitigating spoofing attacks on an SEPP inter-PLMN forwarding interface.

FIG. 8 is a flow chart illustrating an exemplary method for mitigating 5G speaking attacks. Referring to FIG. 8, in step 800, the SEPP obtains, from at least one message received over an inter-PLMN control interface, at least one of a first SEPP identifier and a first PLMN identifier. For example, a responding SEPP 126B may extract an identity for a sending node from an alternative ID field of a X.509 certificate in a TLS message received from a sending node seeking to establish N32-c communications with the responding SEPP. The TLS message may be a certificate message exchanged with a remote node as part of the TLS handshake procedure used to establish the TLS connection with the remote node. The sending node may be an initiating SEPP associated with another PLMN.

In step 800, the responding SEPP may also (optionally) obtain the first PLMN identifier from at least one message received over the inter-PLMN control interface. For example, SEPP 126B may extract the first PLMN identifier from the sender attribute of the SecNegotiateReqData information element transmitted during N32-c security capability negotiations over the first TLS connection and store the PLMN identifier in the database.

In step 802, the responding SEPP stores the at least one of the first SEPP identifier and the first PLMN identifier in the SEPP inter-PLMN forwarding interface identity cross-validation database. For example, SEPP 126A may store the first SEPP identifier, the first PLMN identifier, or both (depending on the level of security screening required by the network operator) in database 600. Table 2 shown below illustrates the status of the database after being populated with the SEPP identifier and the PLMN identifier receive over the inter-PLMN control interface.

TABLE 2

| N32-c TLS Identities and PLMN Identities | |
|---|---|
| SEPP N32-c TLS Identity | SEPP N32-c PLMN |
| sepp1.5gc.mnc123.mcc456.3gppnetwork.org | mnc123.mcc456.3gppnetwork.org |
| sepp2.5gc.mnc321.mcc654.3gppnetwork.org | .mnc321.mcc654.3gppnetwork.org |
| 192.168.0.1 | 192.168.0 |

In Table 2, the first column includes SEPP identities extracted from N32-c TLS certificate messages, and the second column includes PLMN identities extracted from N32-c security capability exchange messages. It should be noted that in Table 2, the PLMNs obtained from the N32-c security capability exchange messages are the same as the PLMNs extracted from the X.509 certificates from the TLS messages. Thus, storing the PLMNs extracted from the N32-c security capability exchange messages is optional in this case. If the PLMN from the N32-c security capability exchange message does not match the PLMN obtained from the N32-c TLS connection, then inter-PLMN communications from the sender of the N32-c message may be blocked.

In step 804, the responding SEPP obtains, from at least one message received of the inter-PLMN forwarding interface, at least one of a second SEPP identifier and a second PLMN identifier. For example, the responding SEPP may obtain a second SEPP identifier from a TLS certificate message received during a TLS handshake for establishing a TLS connection for the N32-f interface and/or a second PLMN identifier from a 5GC service message received over the TLS connection for the forwarding interface.

In step 806, the responding SEPP performs a lookup in the SEPP inter-PLMN forwarding interface identity cross-validation database using a lookup key comprising at least one of the second TLS SEPP identifier and the second PLMN identifier. For example, the responding SEPP may use a lookup key comprising the second TLS SEPP identifier, the second PLMN identifier, or a tuple including the N32-f TLS SEPP identifier and the N32-f PLMN identifier to perform a lookup in database 600.

In step 808, the responding SEPP determines if a matching record is present in the SEPP inter-PLMN forwarding interface identity cross-validation database. If a matching record is not present, this is indicative of an attack, and control proceeds to step 810 where the responding SEPP prevents the at least one message received over the inter-PLMN forwarding interface from entering the PLMN protected by the responding SEPP. For example, the responding SEPP may block the initial message or messages for which the validation failed and subsequent messages received over the TLS connection established for the N32-f interface if the SEPP and/or PLMN identity cross validation fails. If the validation is performed based only on cross-validation of the N32-f TLS SEPP identity with the N32-c TLS SEPP identity and prior to completing establishment of the TLS connection for the N32-f interface, establishment of the TLS connection for the N32-f interface may also be prevented.

In step 808, if a matching identifier is determined to be present in the SEPP inter-PLMN forwarding interface identity cross-validation database, control proceeds to step 812 where the responding SEPP performs a lookup for the second SEPP identifier in the peer SEPP database. The peer SEPP database may be provisioned by the network operator with the identities of SEPPs with which a given SEPP in the operator's network is permitted to communicate. Such SEPPs are referred to herein as peer SEPPs because they may be associated with PLMNs of peer network operators.

In step 814, if the second SEPP identifier is present in the peer SEPP database, control proceeds to step 816 where the SEPP allows messages received over the inter-PLMN forwarding interface to enter the PLMN protected by the SEPP.

The inter-PLMN forwarding interface identity cross-validation can be used in combination with the identity validation described in commonly-assigned, co-pending Indian Provisional Patent Application Number: 202041041754; filed Sep. 25, 2020 (hereinafter, "the '754 Application"), the disclosure of which is incorporated herein by reference in its entirety. The identity verification described in the '754 Application includes extracting the identity of a sending node from a TLS certificate message received for establishing the TLS connection for N32-c communications. This is the same identity described herein that is used for cross validation with the identity extracted from the TLS connection for N32-f communications. In the '754 Application, the TLS identity for N32-c communications is used to validate an identity extracted from an N32-c security capability exchange message. For example, the responding SEPP may extract the N32-c identity from the sender ID attribute of an N32-c SecNegotiateReqData information element of an HTTP POST message from the remote node. If the N32-c identity matches the TLS identity for the TLS connection for N32-c communications, this validation check passes. If the N32-c identity does not match the TLS identity for the TLS connection for N32-c communications, the validation check fails.

Because the N32-c communications should occur prior to the TLS connection establishment for N32-f communication, the validation check performed in the '754 Application may be performed prior to the validation check described herein. If the validation check described in the '754 application fails, then N32-c and N-32-f communications with the node having the identity presented in the sender information element of the N32-c SecNegotiateReqData message should be blocked.

If the validation check described in the '754 Application passes, and the validation checks described in this application fail, N32-f communications associated with the second TLS connection (from the hacker) will be blocked, but the N32-c communications will be allowed (since they likely came from a legitimate SEPP).

If the validation check described in the '754 Application and the validation checks described herein fail, then N32-c and N32-f communications with the identity or identities presented in the N32 SecNegotiateReqData message and the second TLS connection (for N32-f communications) should be blocked.

The subject matter described herein improves network security between SEPPs and PLMNs by performing cross-validation of SEPP identities and PLMN identities exchanged between SEPPs on different interfaces. By comparing N32-c and N32-f SEPP and/or PLMN identities, the SEPP described herein reduces the likelihood of a successful spoofing attack on the N32-f interface, which is the interface that carries service traffic between PLMNs. Reducing the likelihood of a spoofing attack on the forwarding interface used for inter-PLMN service traffic is beneficial, as such an interface carries the bulk of the traffic exchanged between PLMNs. In addition, implementing anti-spoofing mitigation for inter-PLMN forwarding traffic on the SEPP is advantageous because the SEPP is the entry point to the PLMN. Stopping attack traffic at the entry point to the PLMN minimizes the effect of the attack traffic on services provided by the PLMN.

The disclosure of each of the following references is incorporated herein by reference in its entirety.

REFERENCES

1. IETF RFC 5246; The Transport Layer Security (TLS) Protocol, Version 1.2; August 2008.
2. IETF RFC 3280; Internet X.509 Public Key Infrastructure Certificate and Certificate Revocation List (CRL) Profile, April 2002.
3. 3GPP TS 29.573; $3^{rd}$ Generation Partnership Project; Technical Specification Group Core Network and Terminals; 5G System; Public Land Mobile Network (PLMN) Interconnection; Stage 3 (Release 16) V16.3.0 (2020-07).
4. 3GPP TS 33.501; $3^{rd}$ Generation Partnership Project; Technical Specification Group Services and System Aspects; Security Architecture and Procedures for the 5G System; (Release 16), V16.3.0 (2020-07).
5. 3GPP TS 29.510; $3^{rd}$ Generation Partnership Project; Technical Specification Group Core Network and Terminals; 5G System; Network Function Repository Services; Stage 3 (Release 16), V16.4.0 (2020-07).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for mitigating spoofing attacks on a security edge protection proxy (SEPP) inter-public land mobile network (inter-PLMN) forwarding interface, the method comprising:
obtaining, by a responding SEPP and from at least one message received over an inter-PLMN control interface, a first SEPP identifier and a first PLMN identifier, wherein obtaining the first SEPP identifier and the first PLMN identifier from at least one message received over the inter-PLMN control interface comprises obtaining the first SEPP identifier from a first transport layer security (TLS) certificate message received during a TLS handshake for setting up a TLS connection for the inter-PLMN control interface and obtaining the first PLMN identifier from an N32-c security capability exchange message received over the TLS connection for the inter-PLMN control interface;

storing the first SEPP identifier and the first PLMN identifier in an SEPP inter-PLMN forwarding interface identity cross-validation database;

obtaining, by the responding SEPP and from at least one message received over the inter-PLMN forwarding interface, a second SEPP identifier and a second PLMN identifier, wherein obtaining the second SEPP identifier and the second PLMN identifier from at least one message associated received over the inter-PLMN forwarding interface comprises obtaining the second SEPP identifier from a second TLS certificate message receive during a TLS handshake for setting up a TLS connection for the inter-PLMN forwarding interface and obtaining the second PLMN identifier from a 5G service message received over the TLS connection for the inter-PLMN forwarding interface;

performing a lookup in the SEPP inter-PLMN forwarding interface identity cross-validation database using a lookup key comprising the second SEPP identifier and the second PLMN identifier; and determining that a record corresponding to the lookup key is not present in the SEPP inter-PLMN forwarding interface identity cross-validation database, and, in response, preventing the at least one message received over the inter-PLMN forwarding interface from entering a PLMN protected by the responding SEPP, wherein the inter-PLMN control interface comprises an N32-c interface and the inter-PLMN forwarding interface comprises an N32-f interface.

2. The method of claim 1 wherein obtaining the first SEPP identifier and the first PLMN identifier from the at least one message received over the inter-PLMN control interface includes obtaining the first SEPP identifier from a first certificate contained in the TLS certificate message received over the inter-PLMN control interface during the TLS handshake for setting up the TLS connection for the N32-c interface.

3. The method of claim 2 wherein the first certificate comprises a first X.509 certificate.

4. The method of claim 3 wherein obtaining the first SEPP identifier includes extracting the first SEPP identifier from a subject alternative names extension of the first X.509 certificate.

5. The method of claim 4 wherein obtaining the second SEPP identifier and the second PLMN identifier from at least one message received over the inter-PLMN forwarding interface includes obtaining the second SEPP identifier from a second certificate contained in the second TLS certificate message received during the TLS handshake for setting up the TLS connection for the N32-f interface.

6. The method of claim 5 wherein the second certificate comprises a second X.509 certificate.

7. The method of claim 6 wherein obtaining the second SEPP identifier includes extracting the second SEPP identifier from a subject alternative names extension of the second X.509 certificate.

8. The method of claim 1 wherein the lookup key comprises a tuple including the second SEPP identifier and the second PLMN identifier.

9. A system for mitigating spoofing attacks on a security edge protection proxy (SEPP) inter-public land mobile network (inter-PLMN) forwarding interface, the system comprising:

an SEPP including at least one processor and a memory;
an SEPP inter-PLMN forwarding interface identity cross-validation database residing in the memory; and
an inter-PLMN forwarding interface identity spoofing mitigation module implemented by the at least one processor and configured to:

obtain, from at least one message received over an inter-PLMN control interface, a first SEPP identifier and a first PLMN identifier, wherein obtaining the first SEPP identifier and the first PLMN identifier from at least one message received over the inter-PLMN control interface comprises obtaining the first SEPP identifier from a first transport layer security (TLS) certificate message received during a TLS handshake for setting up a TLS connection for the inter-PLMN control interface and obtaining the first PLMN identifier from an N32-c security capability exchange message received over the TLS connection for the inter-PLMN control interface;

store the first SEPP identifier and the first PLMN identifier in an SEPP inter-PLMN forwarding interface identity cross-validation database;

obtain, from at least one message received over the inter-PLMN forwarding interface, a second SEPP identifier and a second PLMN identifier, wherein obtaining the second SEPP identifier and the second PLMN identifier from at least one message associated received over the inter-PLMN forwarding interface comprises obtaining the second SEPP identifier from a second TLS certificate message received during a TLS handshake for setting up a TLS connection for the inter-PLMN forwarding interface and obtaining the second PLMN identifier from a 5G service message received over the TLS connection for the inter-PLMN forwarding interface;

perform a lookup in the SEPP inter-PLMN forwarding interface identity cross-validation database using a lookup key comprising the second SEPP identifier and the second PLMN identifier; and determine that a record corresponding to the lookup key is not present in the SEPP inter-PLMN forwarding interface identity cross-validation database, and, in response, prevent the at least one message received over the inter-PLMN forwarding interface from entering a PLMN protected by the SEPP, wherein the inter-PLMN control interface comprises an N32-c interface and the inter-PLMN forwarding interface comprises an N32-f interface.

10. The system of claim 9 wherein obtaining the first SEPP identifier and the first PLMN identifier includes obtaining the first SEPP identifier from a first certificate contained in the first TLS certificate message received during a TLS handshake for setting up the TLS connection for the N32-c interface.

11. The system of claim 10 wherein the first certificate comprises a first X.509 certificate.

12. The system of claim 11 wherein the inter-PLMN forwarding interface identity spoofing mitigation module is configured to extract the first SEPP identifier from a subject alternative names extension of the first X.509 certificate.

13. The system of claim 12 wherein obtaining the second SEPP identifier and the second PLMN identifier from at least one message received over the inter-PLMN forwarding interface includes receiving a second certificate contained in the second TLS certificate message received during a TLS handshake for setting up the TLS connection for the N32-f interface.

14. The system of claim 13 wherein the second certificate comprises a second X.509 certificate and the inter-PLMN forwarding interface identity spoofing mitigation module is configured to obtain the second identifier by extracting the second identifier from a subject alternative names extension of the X.509 certificate.

15. The system of claim 9 wherein the lookup key comprises a tuple including the second SEPP identifier and the second PLMN identifier.

16. A non-transitory computer readable medium having stored thereon executable instructions that when executed by a processor of a computer to perform steps comprising:

obtaining, by a responding SEPP and from at least one message received over an inter-PLMN control interface, a first SEPP identifier and a first PLMN identifier, wherein obtaining the first SEPP identifier and the first PLMN identifier from at least one message received over the inter-PLMN control interface comprises obtaining the first SEPP identifier from a first transport layer security (TLS) certificate message received during a TLS handshake for setting up a TLS connection for the inter-PLMN control interface and obtaining the first PLMN identifier from an N32-c security capability exchange message received over the TLS connection for the inter-PLMN control interface;

storing the first SEPP identifier and the first PLMN identifier in an SEPP inter-PLMN forwarding interface identity cross-validation database;

obtaining, by the responding SEPP and from at least one message received over the inter-PLMN forwarding interface, a second SEPP identifier and a second PLMN identifier, wherein obtaining the second SEPP identifier and the second PLMN identifier from at least one message associated received over the inter-PLMN forwarding interface comprises obtaining the second SEPP identifier from a second TLS certificate message receive during a TLS handshake for setting up a TLS connection for the inter-PLMN forwarding interface and obtaining the second PLMN identifier from a 5G service message received over the TLS connection for the inter-PLMN forwarding interface;

performing a lookup in the SEPP inter-PLMN forwarding interface identity cross-validation database using a lookup key comprising the second SEPP identifier and the second PLMN identifier; and determining that a record corresponding to the lookup key is not present in the SEPP inter-PLMN forwarding interface identity cross-validation database, and, in response, preventing the at least one message received over the inter-PLMN forwarding interface from entering a PLMN protected by the responding SEPP, wherein the inter-PLMN control interface comprises an N32-c interface and the inter-PLMN forwarding interface comprises an N32-f interface.

* * * * *

UNITED STATES PATENT AND TRADEMARK OFFICE
CERTIFICATE OF CORRECTION

PATENT NO. : 11,832,172 B2
APPLICATION NO. : 17/129441
DATED : November 28, 2023
INVENTOR(S) : Rajput et al.

Page 1 of 2

It is certified that error appears in the above-identified patent and that said Letters Patent is hereby corrected as shown below:

On the Title Page

On page 4, Column 1, item [56] under Foreign Patent Documents, Line 40, delete "ZM" and insert -- ZL --, therefor.

On page 4, Column 2, item [56] under Other Publications, Line 20, delete "197108426" and insert -- 19710842.6 --, therefor.

On page 4, Column 2, item [56] under Other Publications, Line 32, delete "ofthe" and insert -- of the --, therefor.

On page 4, Column 2, item [56] under Other Publications, Line 67, delete "ofthe" and insert -- of the --, therefor.

On page 5, Column 1, item [56] under Other Publications, Line 16, delete "187560180" and insert -- 18756018.0 --, therefor.

On page 5, Column 2, item [56] under Other Publications, Line 72, delete "Appl.l No." and insert -- Appl. No. --, therefor.

On page 6, Column 1, item [56] under Other Publications, Line 17, delete "187319231" and insert -- 18731923.1 --, therefor.

On page 7, Column 1, item [56] under Other Publications, Line 40, delete ""Digitial" and insert -- "Digital --, therefor.

On page 7, Column 2, item [56] under Other Publications, Line 44, Delete "Internatioanl" and insert -- International --, therefor.

On page 8, Column 2, item [56] under Other Publications, Line 26, delete "187560180" and insert Signed and Sealed this
Sixteenth Day of July, 2024

Katherine Kelly Vidal
*Director of the United States Patent and Trademark Office*

CERTIFICATE OF CORRECTION (continued)
U.S. Pat. No. 11,832,172 B2

-- 18756018.0 --, therefor.

On page 9, Column 1, item [56] under Other Publications, Line 19, delete "187052709" and insert -- 18705270.9 --, therefor.

On page 9, Column 1, item [56] under Other Publications, Line 20, after "(dated Dec. 8, 2022)." delete "Ap".

On page 9, Column 1, item [56] under Other Publications, Line 29, delete "207205808" and insert -- 20720580.8 --, therefor.